US010964968B2

(12) United States Patent
Inoue et al.

(10) Patent No.: US 10,964,968 B2
(45) Date of Patent: *Mar. 30, 2021

(54) FUEL CELL STACK AND METHOD OF PRODUCING DUMMY CELL

(71) Applicant: HONDA MOTOR CO., LTD., Tokyo (JP)

(72) Inventors: Daisuke Inoue, Wako (JP); Satoshi Aoki, Wako (JP); Kensuke Umezawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 94 days.

This patent is subject to a terminal disclaimer.

(21) Appl. No.: 16/354,345

(22) Filed: Mar. 15, 2019

(65) Prior Publication Data

US 2019/0296384 A1    Sep. 26, 2019

(30) Foreign Application Priority Data

Mar. 20, 2018 (JP) .............................. JP2018-053297
May 31, 2018 (JP) .............................. JP2018-104760
Jun. 15, 2018 (JP) .............................. JP2018-114310

(51) Int. Cl.
*H01M 8/2465* (2016.01)
*H01M 8/2404* (2016.01)

(52) U.S. Cl.
CPC ....... *H01M 8/2465* (2013.01); *H01M 8/2404* (2016.02); *H01M 2250/20* (2013.01)

(58) Field of Classification Search
CPC ............. H01M 8/2465; H01M 8/2404; H01M 2250/20

See application file for complete search history.

(56) References Cited

U.S. PATENT DOCUMENTS

2006/0110649 A1    5/2006   Nishiyama et al.
2010/0221633 A1*   9/2010   Fujita ................... H01M 8/241
                                                  429/452

(Continued)

FOREIGN PATENT DOCUMENTS

DE      102014210358      4/2015
JP      2007-250338       9/2007
JP           4727972      7/2011

OTHER PUBLICATIONS

German Office Action for German Patent Application No. 102019203743.7 dated Feb. 3, 2020.

*Primary Examiner* — Miriam Stagg
*Assistant Examiner* — Rachel L Zhang
(74) *Attorney, Agent, or Firm* — Amin, Turocy & Watson, LLP

(57) ABSTRACT

A fuel cell stack at least includes a first dummy cell provided at one end of a stack body formed by stacking a plurality of power generation cells in a stacking direction. A dummy assembly of the first dummy cell includes a first electrically conductive porous body, a second electrically conductive porous body, and a third electrically conductive porous body, which are stacked in this order. A first joint layer is interposed between the first electrically conductive porous body and the second electrically conductive porous body to join the first and second electrically conductive porous bodies together, and a second joint layer is interposed between the second electrically conductive porous body and the third electrically conductive porous body to join the second and third electrically conductive porous bodies together. The first joint layer and the second joint layer are provided at different positions in the stacking direction.

29 Claims, 16 Drawing Sheets

(56) References Cited

U.S. PATENT DOCUMENTS

2015/0118587 A1    4/2015  Heo et al.
2016/0211543 A1*   7/2016  Okabe ................. H01M 8/0273
2019/0288301 A1*   9/2019  Inoue ................. H01M 8/2465

* cited by examiner

FUEL CELL STACK AND METHOD OF PRODUCING DUMMY CELL

CROSS-REFERENCE TO RELATED APPLICATIONS

This application is based upon and claims the benefit of priority from Japanese Patent Applications No. 2018-053297 filed on Mar. 20, 2018, No. 2018-104760 filed on May 31, 2018 and No. 2018-114310 filed on Jun. 15, 2018, the contents all of which are incorporated herein by reference.

BACKGROUND OF THE INVENTION

Field of the Invention

The present invention relates to a fuel cell stack including a stack body and a dummy cell. The stack body is formed by stacking a plurality of power generation cells together in a stacking direction. Each of the power generation cells includes a membrane electrode assembly, a resin frame member provided around the membrane electrode assembly, and separators. The dummy cell is provided at least at one end of the stack body in the stacking direction. Further, the present invention relates to a method of producing the dummy cell.

Description of the Related Art

In general, a solid polymer electrolyte fuel cell employs a solid polymer electrolyte membrane (hereinafter simply referred to as the electrolyte membrane). The solid polymer electrolyte membrane is a polymer ion exchange membrane. The fuel cell includes a membrane electrode assembly (MEA) including an anode provided on one surface of the electrolyte membrane, and a cathode provided on the other surface of the electrolyte membrane.

The membrane electrode assembly is sandwiched between separators to form a power generation cell, and a plurality of the power generation cells are stacked together to form a stack body. Power collecting terminals for collecting electric charges generated by power generation in each of the power generation cells, and end plates for holding the power generation cells in the stacked state are provided at both ends of the stack body in the stacking direction to form the fuel cell stack.

Since heat dissipation from ends of the stack body in the stacking direction (hereinafter also simply referred to as the end(s) or the end side(s)) is facilitated through terminal plates, etc., the end sides of the stack body in the stacking direction tend to have low temperature in comparison with the central side of the stack body in the stacking direction. When the temperature of the end sides of the stack body becomes low due to influence of the external temperature, etc., and water condensation occurs, there is a concern that reactant gases are not diffused smoothly, and the desired power generation stability of the fuel cell stack may not be achieved.

In an attempt to address the problem, for example, in a fuel cell stack disclosed in Japanese Patent No. 4,727,972, so called dummy cells are provided at least at one end of the stack body in the stacking direction. In the dummy cells, since metal plates are used instead of electrolyte membranes, power generation is not performed, and water is not produced. Therefore, the dummy cells themselves function as heat insulating layers between the terminal plates and the stack body. Thus, by providing the dummy cells as described above, it is possible to suppress decrease in the temperature at the end of the stack body. That is, it is possible to reduce the influence of the external temperature on the fuel cell stack, and improve the power generation stability.

SUMMARY OF THE INVENTION

A main object of the present invention is to provide a fuel cell stack which makes it possible to improve power generation stability.

Another object of the present invention is to provide a method of producing a dummy cell which makes it possible to improve power generation stability.

According to an aspect of the present invention, a fuel cell stack including a stack body and a dummy cell is provided. The stack body includes a plurality of power generation cells stacked together in a stacking direction. Each of the power generation cells includes a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having gas a diffusion layer of electrically conductive porous body. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly is formed by stacking a first electrically conductive porous body, a second electrically conductive porous body, and a third electrically conductive porous body each having a difference surface size in a manner that the second electrically conductive porous body is stacked on the first electrically conductive porous body, and the third electrically conductive porous body is stacked on the second electrically conductive porous body. A first joint layer interposed between the first electrically conductive porous body and the second electrically conductive porous body to join the first electrically conductive porous body and the second electrically conductive porous body together and a second joint layer interposed between the second electrically conductive porous body and the third electrically conductive porous body to join the second electrically conductive porous body and the third electrically conductive porous body together are provided. The first joint layer and the second joint layer are arranged at different positions in the stacking direction.

In the fuel cell stack, the dummy cell including the dummy assembly is provided instead of the membrane electrode assembly of the power generation cell, at least at one end of the stack body in the stacking direction. In the dummy assembly, the first joint layer joining the first electrically conductive porous body and the second electrically conductive porous body together and the second joint layer joining the second electrically conductive porous body and the third electrically conductive porous body together are provided at different positions in the stacking direction. Therefore, in comparison with the case where the first joint layer and the second joint layer are provided at the same position, it is possible to suppress increase in the thickness of the dummy cell partially. Even if the dummy cell is stacked on the power generation cell, it is possible to suppress local increase in the surface pressure in the power generation cell, and thus, it is possible to suppress degradation of the durability of the electrolyte membrane, e.g., due to creeps in the electrolyte membrane of the power generation cell.

Further, since the dummy cell does not include the solid polymer electrolyte membrane and the electrode catalyst layer, power generation is not performed, and thus, no water is produced as a result of power generation. Therefore, each of the dummy cells itself functions as a heat insulating layer, and it is possible to suppress water condensation in each of the dummy cells. Since the dummy cell is provided at least at one end of the stack body, it is possible to improve the heat insulating performance at the end of the stack body. Therefore, even in the environment at low temperature, it is possible to suppress decrease in the temperature at the ends of the stack body in comparison with the central position of the stack body. That is, it is possible to improve the power generation stability.

Further, since it is possible to improve the heat insulating performance at the end of the stack body, even in the case of starting operation of the fuel cell stack below the freezing temperature, it is possible to effectively increase the temperature of the entire stack body. Therefore, it is possible to suppress decrease in the voltage due to freezing of the produced water at the end of the stack body.

As described above, in the fuel cell stack, since the dummy cell can be stacked on the power generation cell while suppressing local increase in the surface pressure, it becomes possible to improve power generation stability without degrading durability of the electrolyte membrane.

In the fuel cell stack, preferably, the first joint layer is provided discontinuously on a marginal position of a first stack part where the first electrically conductive porous body and the second electrically conductive porous body are stacked together, and the second joint layer is provided discontinuously on a marginal position of a second stack part where the second electrically conductive porous body and the third electrically conductive porous body are stacked together. In this case, in comparison with the case of providing the first joint layer and the second joint layer continuously in the marginal portions of the first stack part and the second stack part, since it is possible to obtain the dummy assembly in the simple step, improvement in the production efficiency of the fuel cell stack is achieved.

In the fuel cell stack, preferably, the first joint layer and the second joint layer are provided alternately in a peripheral direction of the first stack part and the second stack part. In this case, it is possible to join the first electrically conductive porous body, the second electrically conductive porous body, and the third electrically conductive porous body in the simple joining step with the sufficient strength. Further, it becomes possible to effectively suppress local increase in the surface pressure in the power generation cell stacked on the dummy cell.

In the fuel cell stack, preferably, each of the first electrically conductive porous body, the second electrically conductive porous body, and the third electrically conductive porous body has a rectangular surface, and the first joint layer and the second joint layer are provided on the long sides, excluding short sides, of the rectangular surface. In this case, since increase in the internal resistance is suppressed by stacking the dummy cell on the power generation cell, it becomes possible to include the dummy cell in the fuel cell stack without causing any influence on the power generation performance.

In the fuel cell stack, preferably, the surface size of the second electrically conductive porous body is larger than the surface size of the first electrically conductive porous body, the surface size of the third electrically conductive porous body is larger than the surface size of the second electrically conductive porous body, the dummy resin frame member includes an outer marginal portion, a shelf protruding inward from an inner end of the outer marginal portion through a first stepped surface over the entire periphery, and a thin portion protruding inward from an inner end of the shelf over the entire periphery through a second stepped surface, and an outer marginal portion of the third electrically conductive porous body is overlapped with the shelf of the dummy resin frame member, an outer marginal portion of the second electrically conductive porous body is positioned adjacent to the thin portion of the dummy resin frame member, and an outer end surface of the first electrically conductive porous body faces an inner end surface of the dummy resin frame member.

In the fuel cell stack, preferably, the thickness of the second electrically conductive porous body is larger than the height of the second stepped surface.

In the fuel cell stack, preferably, space is formed between the thin portion of the dummy resin frame member and the third electrically conductive porous body.

In the fuel cell stack, preferably, the surface size of the second electrically conductive porous body is larger than the surface size of the first electrically conductive porous body, the surface size of the third electrically conductive porous body is larger than the surface size of the second electrically conductive porous body, the dummy resin frame member includes a first stepped surface facing an outer end surface of the third electrically conductive porous body at a distance La therebetween, a second stepped surface facing an outer end surface of the second electrically conductive porous body at a distance Lb therebetween, and an inner end surface facing an outer end surface of the first electrically conductive porous body at a distance Lc therebetween, and the relationship of La<Lc<Lb is satisfied.

The distance La between the outer end surface of the third electrically conductive porous body having the largest surface size and the first stepped surface of the dummy resin frame member is smaller than the distance Lb between the outer end surface of the second electrically conductive porous body and the second stepped surface of the dummy resin frame member Lb and the distance Lc between the outer end surface of the first electrically conductive porous body and the inner end surface of the dummy resin frame member. Therefore, at the time of providing the dummy resin frame member around the dummy assembly, since it is possible to position the dummy assembly and the dummy resin frame member in correspondence with the small distance La as described above, it is possible to improve the positioning accuracy. In this manner, it becomes possible to obtain each of the dummy cells with high quality in the simple step.

The second electrically conductive porous body is interposed between the first electrically conductive porous body and the third electrically conductive porous body. Therefore, in the resin frame equipped dummy assembly, it is not easy to confirm the positional relationship between the outer end surface of the second electrically conductive porous body and the second stepped surface of the dummy resin frame member visually, or using image processing, etc. in comparison with the positional relationship between the outer send surface of the first electrically conductive porous body and the inner end surface of the dummy resin frame member.

Even in the case of providing the dummy resin frame member around such dummy assembly, the distance Lb is larger than the distance Lc as described above. Therefore, by spacing the outer end surface of the first electrically conductive porous body from the inner end surface of the dummy resin frame member by the distance Lc, it is possible to avoid interference (contact) between the outer end surface of the second electrically conductive porous body and the second stepped surface of the dummy resin frame member. Also in this manner, it is possible to obtain each of the dummy cells with high quality in the simple step.

As described above, the surface sizes of the third electrically conductive porous body, the second electrically conductive porous body, and the first electrically conductive porous body are determined to have the relationship of: the first electrically conductive porous body<the second electrically conductive porous body<the third electrically conductive porous body. Therefore, for example, after the second electrically conductive porous body is stacked on the third electrically conductive porous body, the first electrically conductive porous body is stacked on the second electrically conductive porous body. In this manner, it is possible to form the dummy assembly while adjusting the positional relationship among the electrically conductive porous bodies. That is, at the time of stacking the second electrically conductive porous body on the third electrically conductive porous body, it is possible to adjust the distance Lb easily, and at the time of stacking the first electrically conductive porous body on the second electrically conductive porous body, it is possible to adjust the distance Lc easily. As a result, it becomes possible to simplify the production process of the dummy cell.

As described above, in the fuel cell stack, it is possible to improve the power generation stability by the dummy cell obtained with high quality in the simple step.

In the fuel cell stack, preferably, the dummy resin frame member includes an outer marginal portion, a shelf protruding inward from an inner end of the outer marginal portion through the first stepped surface over the entire periphery, and a thin portion protruding inward from an inner end of the shelf through the second stepped surface over the entire periphery, and an outer exposed portion of the second electrically conductive porous body protruding outward from an outer end surface of the first electrically conductive porous body is configured to face the thin portion and contact a protruding end surface of a bank protruding from the thin portion toward the outer exposed portion of the second electrically conductive porous body.

In the fuel cell stack, preferably, an outer exposed portion of the third electrically conductive porous body extending outward beyond an outer end surface of the second electrically conductive porous body and the shelf of the dummy resin frame member are joined together by an impregnation joint part where the outer exposed portion of the third electrically conductive porous body is impregnated with adhesive resin. In the structure, in comparison with the dummy resin frame member and the dummy assembly that are joined together using adhesive only between the dummy resin frame member and the dummy assembly, since the adhesive resin is impregnated into the third electrically conductive porous body, it is possible to increase the joining strength of joining the dummy resin frame member and the dummy assembly together.

In the fuel cell stack, preferably, the resin impregnation joint part is provided discontinuously in the outer exposed portion of the third electrically conductive porous body in a peripheral direction. Unlike the power generation cell which suppress cross leakage, etc. by joining the resin frame member and the outer end of the membrane electrode assembly in an air-tight manner, in the dummy cells which does not perform power generation, there is no need to control cross leakage, etc. Therefore, by providing the joint part discontinuously in the peripheral portion, it becomes possible to simplify the resin frame joining step of joining the dummy assembly and the dummy resin frame member together, and improve the production efficiency of the fuel cell stack.

In the fuel cell stack, preferably, the first electrically conductive porous body, the second electrically conductive porous body, and the third electrically conductive porous body have the same thickness. In this case, it becomes possible to simplify the step of obtaining the dummy cell to a greater extent.

In the fuel cell stack, preferably, an electrically conductive porous body as one of the first electrically conductive porous body, the second electrically conductive porous body, and the third electrically conductive porous body, and the dummy resin frame member are joined together by providing an impregnation joint part where the electrically porous body is impregnated with adhesive resin, discontinuously in a peripheral direction of an outer periphery of the electrically conductive porous body, and the impregnation joint part includes a corner joint part provided at a corner of the electrically conductive porous body, and an adjacent joint part provided on a long side of the electrically conductive porous body at a position adjacent to the corner joint part.

As described above, in the dummy cell which does not perform power generation, there is no need to suppress cross leakage, etc. Therefore, by providing the impregnation joint part discontinuously in the peripheral direction in the outer periphery of at least one electrically conductive porous body of the dummy assembly, it becomes possible to simplify the joining step of joining the dummy assembly and the dummy resin frame member, and obtain the dummy cell efficiently.

As described above, though the resin frame joining step is simplified, since the impregnation joint part includes the corner joint part and the adjacent joint part, the sufficient joining strength of joining the dummy assembly and the dummy resin frame member together is achieved. Further, since the impregnation joint part includes the resin impregnation portion formed by impregnating the electrically conductive porous body with adhesive resin, for example, in comparison with the case where adhesive is provided only between the dummy resin frame member and the electrically conductive porous body, it is possible to join the dummy assembly and the dummy resin frame member together with high strength. Accordingly, it is possible to achieve the high quality of the dummy cell.

At the time of impregnating the electrically conductive porous body with adhesive resin molten by heating, the temperature of the dummy resin frame member around the resin joint part becomes relatively high. By providing the impregnation joint part discontinuously as described above, for example, in comparison with the case of providing the impregnation joint part around the electrically conductive porous body, it is possible to reduce the area of the dummy resin frame member having high temperature. As a result, since it is possible to suppress warpage, etc. by heating of the dummy resin frame member, it is possible to obtain the dummy cell with high quality also in this respect.

As described above, in the fuel cell stack, it is possible to improve the power generation stability by the dummy cell obtained efficiently in the simple step with high quality.

In the fuel cell stack, preferably, the impregnation joint part further includes a long side joint part positioned so as to divide the long side of the electrically conductive porous body between the corner joint parts into a plurality of long side segments, and a short side joint part positioned so as to divide the short side of the electrically conductive porous body between the corner joint parts into a plurality of short side segments, and the length of each of the long side segments is larger than the length of each of the short segments. In the structure, it becomes possible to join the dummy assembly and the dummy resin frame member not only efficiently, but also with the increased joining strength.

In the fuel cell stack, preferably, the long side segments have the same length, the short side segments have the same length, and the relationship of Ld<Lf<Le is satisfied where Ld is the interval between the corner joint part and the adjacent joint part adjacent to the corner joint part, Le is the length of the long side segment, and Lf is the length of the short side segment. In this case, it is possible to simplify the resin frame joining step of joining the dummy assembly and the dummy resin frame member together, and effectively increase the joining strength of joining the dummy assembly and the dummy resin frame member together, and obtain the dummy cell with high quality.

In the fuel cell stack, preferably, the adhesive resin is part of the molten dummy resin frame member. In this case, with the simpler step of melting part of the dummy resin frame member and impregnating the electrically conductive porous body with the part of the dummy resin frame member, it is possible to simplify the step of joining the dummy resin frame assembly and the electrically conductive porous body together to a greater extent, and obtain the dummy cell efficiently.

In the fuel cell stack, preferably, the part of the dummy resin frame member is a resin projection provided so as to protrude in a thickness direction of the dummy resin frame member. In this case, it is possible to impregnate the electrically conductive porous body with a sufficient quantity of adhesive resin obtained by melting the dummy resin projection, to form the impregnation joint part suitably. In this manner, it is possible increase the joining strength of joining the dummy resin frame member and the electrically conductive porous body together in the simple step.

In the fuel cell stack, preferably, the surface size of the second electrically conductive porous body is larger than the surface size of the first electrically conductive porous body, the surface size of the third electrically conductive porous body is larger than the surface size of the second electrically conductive porous body, the dummy resin frame member includes an outer marginal portion, a shelf protruding inward from an inner end of the outer marginal portion through a first stepped surface over the entire periphery, and a thin portion protruding inward from an inner end of the shelf through a second stepped surface over the entire periphery, an outer marginal portion of the third electrically conductive porous body is overlapped with the shelf of the dummy resin frame member, an outer marginal portion of the second electrically conductive porous body is positioned adjacent to the thin portion of the dummy resin frame member, an outer end surface of the first electrically conductive porous body faces an inner end surface of the dummy resin frame member, and the shelf of the dummy resin frame member and an outer marginal portion of the third electrically conductive porous body are joined together by the impregnation joint part.

According to another aspect of the present invention, a method of producing a dummy cell is provided. The dummy cell is provided at least at one end of a stack body of a fuel cell stack in a stacking direction. The fuel cell stack includes the stack body including a plurality of power generation cells stacked together in the stacking direction. Each of a plurality of power generation cells includes a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having a gas diffusion layer of electrically conductive porous body. The method includes a first stacking step of stacking a first electrically conductive porous body, a second electrically conductive porous body, and a third electrically conductive porous body each having a difference surface size, in a stacking direction in a manner that a first adhesive layer is interposed between the first electrically conductive porous body and the second electrically conductive porous body, and a second adhesive layer is interposed between the second electrically conductive porous body and the third electrically conductive porous body, a hardening step of hardening the first adhesive layer and the second adhesive layer to form a first joint layer for joining the first electrically conductive porous body and the second electrically conductive porous body and form a second joint layer for joining the second electrically conductive porous body and the third electrically conductive porous body, and thereby obtaining a dummy assembly corresponding to the membrane electrode assembly, a resin frame joining step of providing a dummy resin frame member on the dummy assembly and around the dummy assembly to thereby obtain a resin frame equipped dummy assembly, and a second stacking step of sandwiching the resin frame equipped dummy assembly between dummy separators to thereby obtain the dummy cell. The first adhesive layer and the second adhesive layer are provided at different positions in the stacking direction in the first stacking step, to thereby form the first joint layer and the second joint layer at different positions in the stacking direction in the hardening step.

In the method of producing the dummy cell, it is possible to obtain the dummy cell including the dummy assembly having the first joint layer and the second joint layer in which the positions of the first joint layer and the second joint layer are different from each other in the stacking direction. In the structure, in comparison with the case where the first joint layer and the second joint layer are provided at the same position, it is possible to partially suppress increase in the thickness of each of the dummy cells. Even if the dummy cells are stacked on the power generation cell, it is possible to suppress local increase in the surface pressure in the power generation cell, and thus, it is possible suppress degradation of the durability of the electrolyte membrane, e.g., due to creeps in the electrolyte membrane of the power generation cell.

In the dummy cell, power generation is not performed, and thus, water is not produced. In the fuel cell stack including the dummy cell at least at one end of the stack body in the stacking direction, it is possible to improve the heat insulating performance at the end of the stack body, and thus, improve the power generation stability of the stack body.

As described above, in the method of producing the dummy cell, it is possible to obtain the dummy cell which can be stacked on the power generation cell while suppressing local increase in the surface pressure, it becomes possible to improve power generation stability without degrading durability of the electrolyte membrane of the fuel cell stack including this dummy cell.

In the method of producing the dummy cell, preferably, after the first electrically conductive porous body, the second electrically conductive porous body, and the third electrically conductive porous body are stacked together in the first stacking step, in the state where surface pressure equal to surface pressure applied during power generation of the fuel cell stack is applied to the first electrically conductive porous body, the second electrically conductive porous body, and the third electrically conductive porous body, the first adhesive layer and the second adhesive layer are hardened in the hardening step. In the state where the surface pressure is applied in this manner, when the dummy cell is assembled in the fuel cell stack, it is possible to suppress the local increase in the surface pressure of the power generation cells to a greater extent.

In the method of producing the dummy cell, preferably, in the first stacking step, the first adhesive layer is provided discontinuously in a marginal portion of a first stack part where the first electrically conductive porous body and the second electrically conductive porous body are stacked together, and the second adhesive layer is provided discontinuously in a marginal portion of a second stack part where the second electrically conductive porous body and the third electrically conductive porous body are stacked together. In comparison with the case of providing the first joint layer and the second joint layer continuously in the marginal portions of the first stack part and the second stack part, it is possible to obtain the dummy cell in the simple step efficiently.

In the method of producing the dummy cell, preferably, in the first stacking step, the first adhesive layer and the second adhesive layer are provided alternately in a peripheral direction of the first stack part and the second stack part. In this case, it is possible to join the first electrically conductive porous body, the second electrically conductive porous body, and the third electrically conductive porous body in the simple joining step with the sufficient strength. Further, it becomes possible to obtain the dummy cell which makes it possible to effectively suppress local increase in the surface pressure when the dummy cell is stacked on the power generation cell.

In the method of producing the dummy cell, preferably, in the first stacking step, the first adhesive layer and the second adhesive layer are provided on long sides, excluding short sides, of the first electrically conductive porous body, the second electrically conductive porous body, and the third electrically conductive porous body each having a rectangular surface. In this case, since increase in the internal resistance is suppressed by the dummy cell stacked on the power generation cell, it becomes possible to include the dummy cell in the fuel cell stack without causing any influence on the power generation performance.

In the method of producing the dummy cell, preferably, in the resin frame joining step, in the state where the dummy resin frame member is provided around the dummy assembly, an outer marginal portion of an electrically conductive porous body as at least one of the first electrically conductive porous body, the second electrically conductive porous body, and the third electrically conductive porous body is impregnated with adhesive resin discontinuously in a peripheral direction of the outer marginal portion to form an impregnation joint part, to thereby join the dummy assembly and the dummy resin frame member together.

In the method of producing the dummy cell, in the resin frame joining step, the impregnation joint part is provided discontinuously in the peripheral portion in the outer periphery of at least one electrically conductive porous body of the dummy assembly to join the dummy assembly and the dummy resin frame member. Therefore, in comparison with the case of providing the impregnation joint part around the electrically conductive porous body, it is possible to simplify the resin frame joint step, and obtain the dummy cell efficiently.

Also in such a simple resin frame joining step, since the impregnation joint part is formed by impregnating the electrically conductive porous body with the adhesive resin, it is possible to increase the joining strength of joining the dummy resin frame member and the electrically conductive porous body together. Further, by providing the impregnation joint part as described above, it is possible to suppress occurrence of warpage, etc. of the dummy resin frame member due to heating.

By providing the dummy cell as described above at least at one end of the stack body in the stacking direction, it is possible to increase the heat insulating performance at the end of the stack body, and thus, it is possible to improve the power generation stability of the fuel cell stack.

As described above, in the method of producing the dummy cell, in the simple step, it is possible to obtain the dummy cell with high quality efficiently, and improve the power generation stability of the fuel cell stack including the dummy cell.

In the method of producing the fuel cell stack, preferably, in the resin frame joining step, as the impregnation joint part, a corner joint part is formed at a corner of the electrically conductive porous body, and an adjacent joint part is formed at a position adjacent to the corner joint part on a long side of the electrically conductive porous body. In this case, also in the resin frame joining step simplified by providing the impregnation joint part discontinuously, since it is possible to join the dummy resin frame member and the electrically conductive porous body with sufficient strength, it is possible to obtain the dummy cell with high quality.

In the method of producing the dummy cell, preferably, in the resin frame joining step, as the impregnation joint part, a long side joint part is provided to divide the long side of the electrically conductive porous body between the corner joint parts into a plurality of long side segments, and a short side joint part is provided to divide the short side of the electrically conductive porous body between the corner joint parts into a plurality of short side segments in a manner that each of the long side segments becomes longer than each of the short side segments. In the structure, it becomes possible to join the dummy structural body and the dummy resin frame member together not only efficiently, but also with sufficient strength.

In the method of producing the dummy cell, in the resin frame joining step, the impregnation joint part is provided on the electrically conductive porous body such that the long side segments have the same length, the short side segments have the same length, and the relationship of $Ld<Lf<Le$ is satisfied where $Ld$ is the interval between the corner joint part and the adjacent joint part adjacent to the corner joint part, $Le$ is the length of the long side segment, and $Lf$ is the length of the short side segment. In this case, it is possible to simplify the resin frame joining step of joining the dummy assembly and the dummy resin frame member together, and increase the joining strength of the dummy assembly and the dummy resin frame member together, and obtain the dummy cell with high quality.

In the method of producing the dummy cell, preferably, in the resin frame joining step, as the adhesive resin, the electrically conductive porous body is impregnated with part of the dummy resin frame member which has been molten, to thereby form the impregnation joint part. In this case, in the simple step where part of the dummy resin frame member is molten, and the electrically conductive porous body is impregnated with the molten resin of the dummy resin frame member, it is possible to simplify the step of joining the dummy assembly and the dummy resin member together to a greater extent, and obtain the dummy cell efficiently.

In the method of producing the dummy cell, preferably, in the resin frame joining step, a resin projection provided to protrude in the thickness direction of the dummy resin frame member is used as the part of the dummy resin frame member. In this case, it is possible to impregnate the electrically conductive porous body with a sufficient quantity of adhesive resin obtained by melting the dummy resin projection, to obtain the impregnation joint part suitably. In this manner, it is possible increase the joining strength of joining the dummy resin frame member and the electrically conductive porous body together in simple step.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
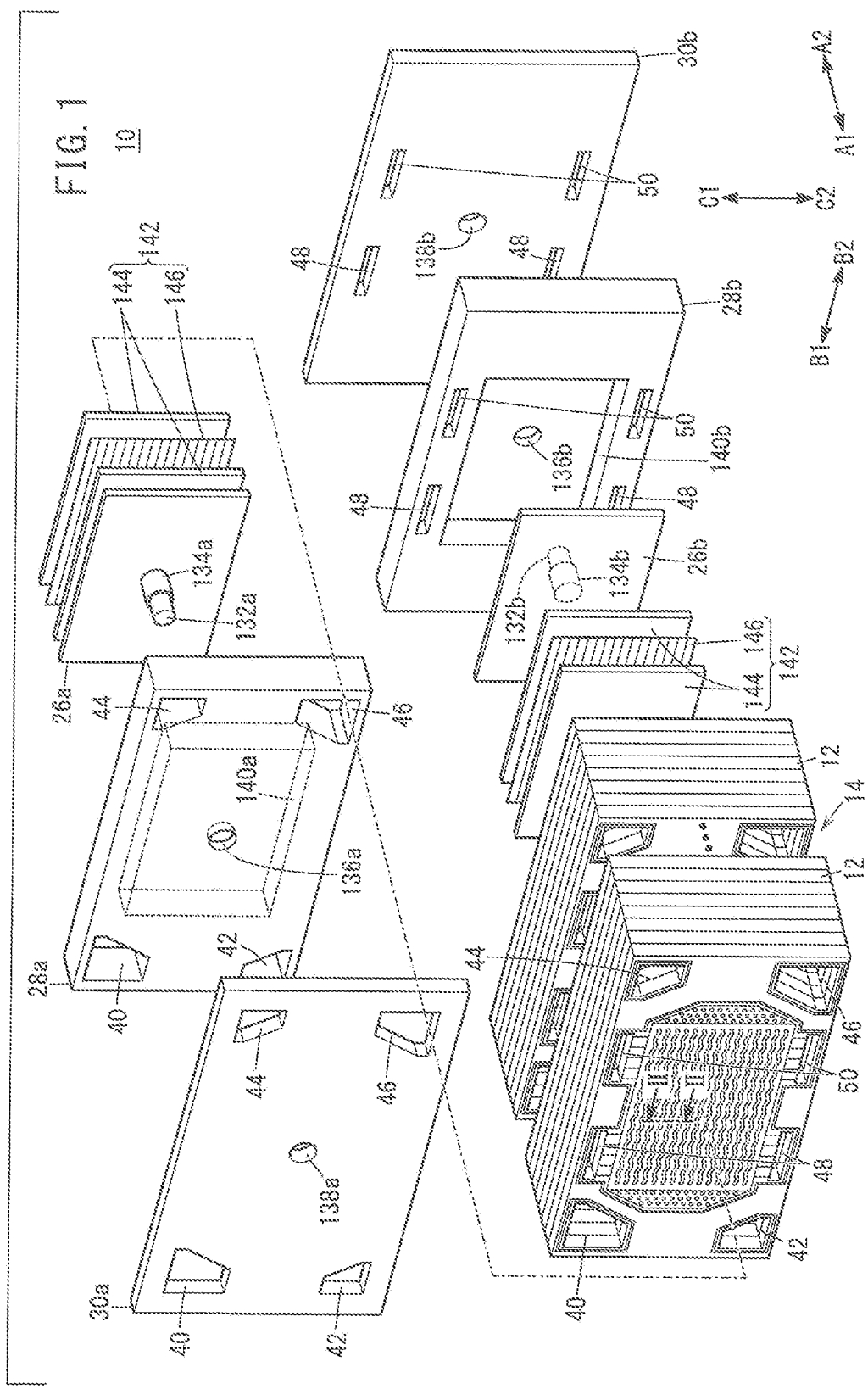
FIG. 1 is an exploded perspective view showing a fuel cell stack according to an embodiment of the present invention.

A preferred embodiment of a fuel cell stack, and a method of producing a dummy cell according to the present invention will be described in detail with reference to the accompanying drawings. In the drawings, the constituent elements which have the same or similar functions and which offer the same or similar advantages are labeled with the same reference numerals, and description of such constituent elements may not be repeated.

Figure 2:
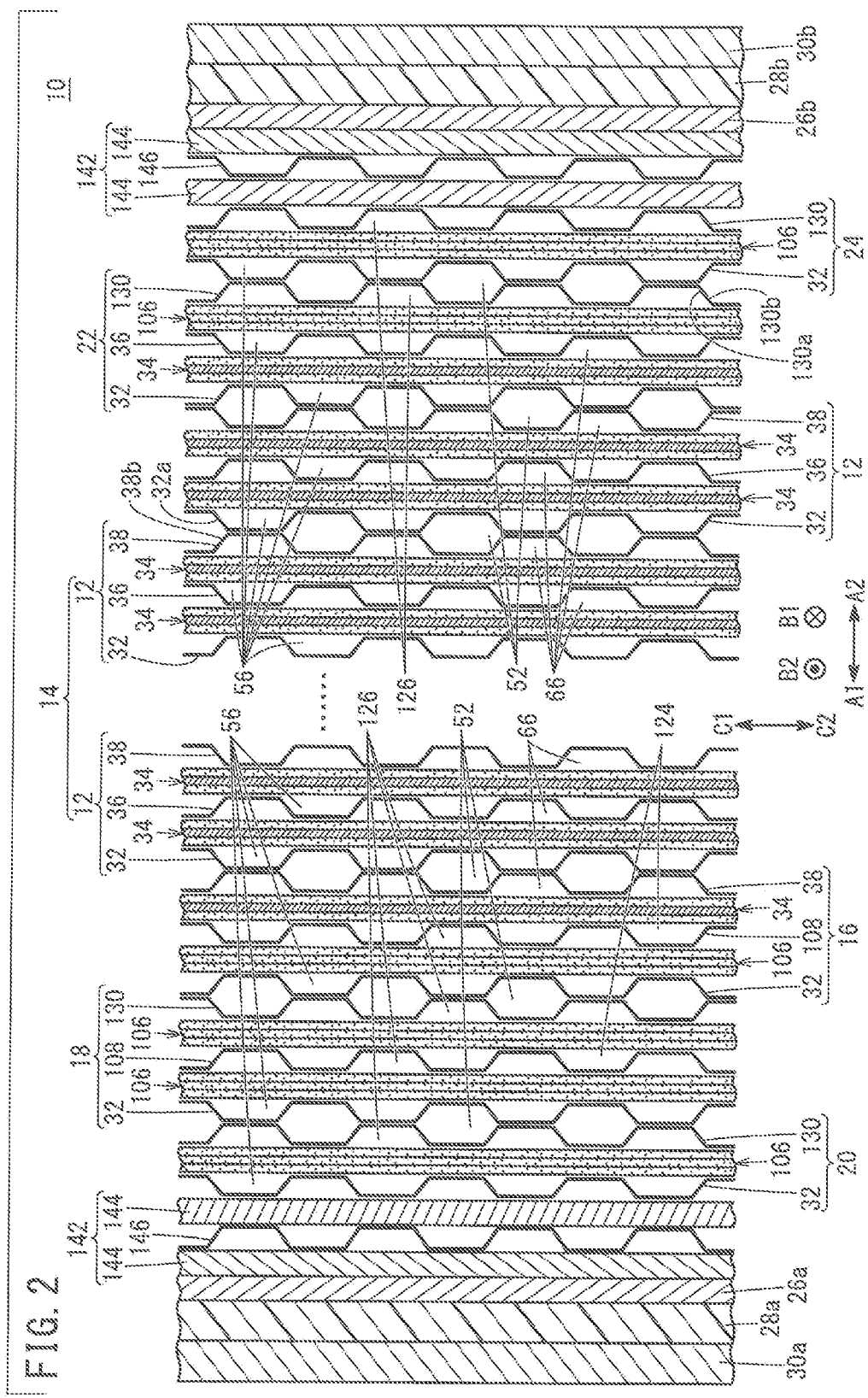
FIG. 2 is a cross sectional view showing the fuel cell stack taken along a line II-II in FIG. 1.

As shown in FIGS. 1 and 2, the fuel cell stack 10 according to the embodiment of the present invention includes a stack body 14 formed by stacking a plurality of power generation cells 12 in a horizontal direction (indicated by arrows A1 and A2) or in the gravity direction (indicated by arrows C1 and C2). For example, the fuel cell stack 10 is mounted in a fuel cell vehicle such as a fuel cell electric automobile (not shown).

As shown in FIG. 2, at one end of the stack body 14 in a stacking direction of the stack body 14 (indicated by an arrow A1), a first end power generation unit 16 is provided. A first dummy cell 18 is provided outside the first end power generation unit 16, and a second dummy cell 20 is provided outside the first dummy cell 18. Further, a second end power generation unit 22 is provided at the other end of the stack body 14 in the stacking direction indicated by the arrow A2, a second end power generation unit 22 is provided. A third dummy cell 24 is provided outside the second end power generation unit 22. A terminal plate 26a is provided outside the second dummy cell 20 of the stack body 14 in the direction indicated by the arrow A1, and an insulator 28a is provided outside the terminal plate 26a, and an end plate 30a is provided outside the insulator 28a. A terminal plate 26b is provided outside the third dummy cell 24 of the stack body 14 in the direction indicated by an arrow A2. An insulator 28b is provided outside the terminal plate 26b, and an end plate 30b is provided outside the insulator 28b.

As shown in FIG. 1, coupling bars (not shown) are provided between sides of rectangular end plates 30a, 30b. Both ends of each of the coupling bars are fixed to inner surfaces of the end plates 30a, 30b using bolts (not shown) to apply a tightening load to a plurality of power generation cells 12 in the stacking direction indicated by arrows A1, A2. The fuel cell stack 10 may include a casing having the end plates 30a, 30b, and the stack body 14, etc. may be placed in the casing.

Figure 3:
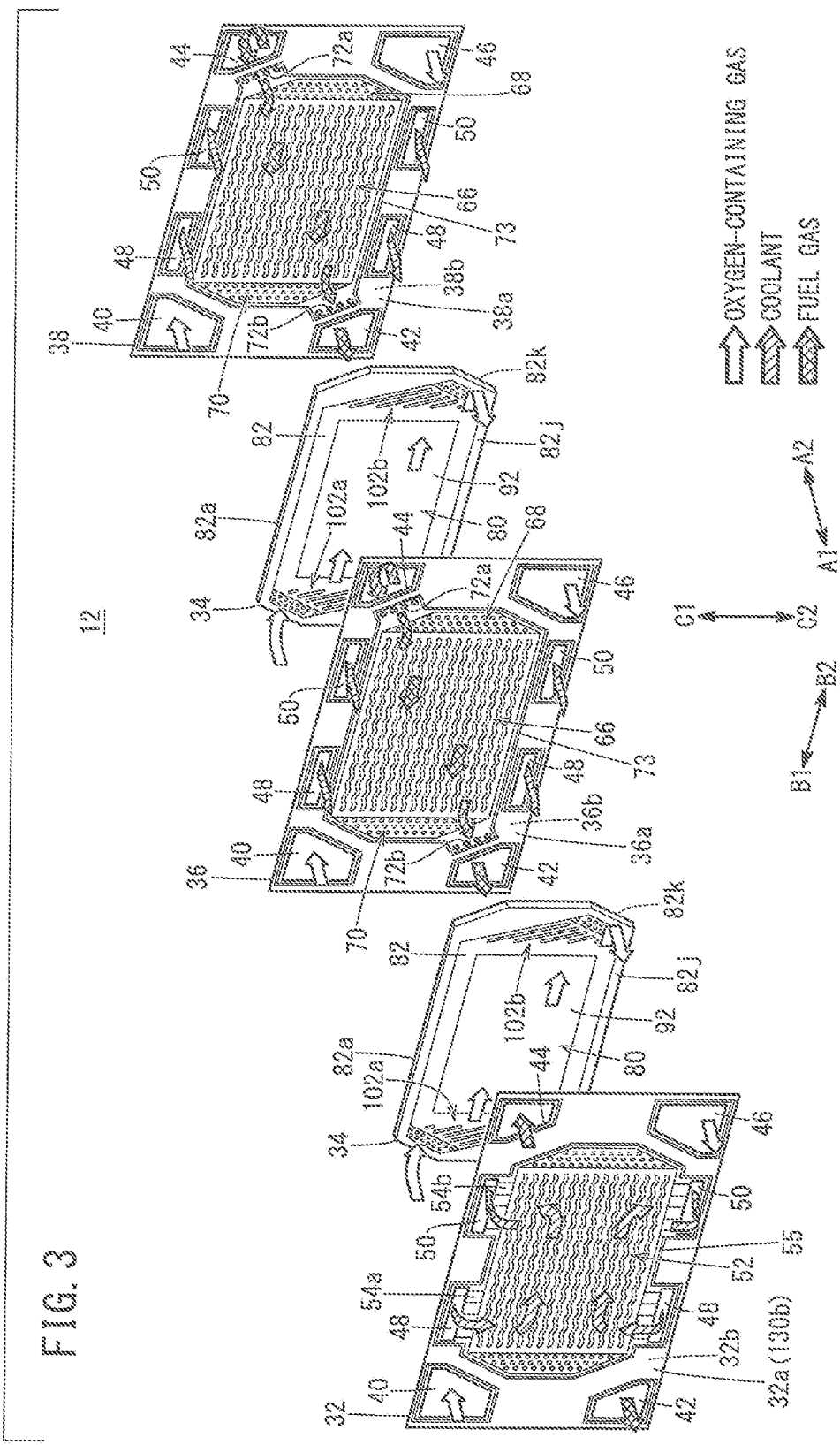
FIG. 3 is an exploded perspective view showing a power generation cell.

As shown in FIG. 3, the power generation cell 12 includes a first separator 32, a resin frame equipped MEA 34 stacked on the first separator 32, a second separator 36 stacked on the resin frame equipped MEA 34, a resin frame equipped MEA 34 stacked on the second separator 36, and a third separator 38 stacked on the resin frame equipped MEA 34. Each of the first separator 32, the second separator 36, and the third separator 38 (each of the separators) are in the form of a steel plate, a stainless steel plate, an aluminum plate, a plated steel plate, and formed by press forming, etc., to have a rectangular shape in a plan view and have a corrugated shape in cross section.

As shown in FIGS. 1 and 3, at one end of each separator in the longitudinal direction (horizontal direction) indicated by an arrow B1, an oxygen-containing gas supply passage 40 and a fuel gas discharge passage 42 are provided. The oxygen-containing gas supply passage 40 and the fuel gas discharge passage 42 extend through each separator in the stacking direction indicated by the arrows A1 and A2, respectively. An oxygen-containing gas is supplied through the oxygen-containing gas supply passage 40. A fuel gas is discharged through the fuel gas discharge passage 42. These oxygen-containing gas and the fuel gas are also referred to as the reactant gases, collectively.

At the other end of each separator in the longitudinal direction indicated by an arrow B2, a fuel gas supply passage 44 for supplying the fuel gas and an oxygen-containing gas discharge passage 46 for discharging the oxygen-containing gas are provided. The fuel gas supply passage 44 and the oxygen-containing gas discharge passage 46 extend through each separator in the stacking direction indicated by the arrows A1, A2, respectively. The oxygen-containing gas supply passage 40, the fuel gas discharge passage 42, the fuel gas supply passage 44, and the oxygen-containing gas discharge passage 46 are also referred to as the reactant gas passage, collectively.

At both ends in the lateral direction of each separator (vertical direction indicated by the arrows C1, C2), a pair of coolant supply passages 48 for supplying a coolant are provided on the side indicated by the arrow B1. The coolant supply passages 48 extend through each separator in the direction indicated by arrows A1, A2. At both ends in the lateral direction of each separator, a pair of coolant discharge passages 50 for discharging the coolant are provided on the side indicated by the arrow B2. The coolant discharge passages 50 extend through each separator in the direction indicated by the arrows A1, A2.

As shown in FIG. 3, a coolant flow field 52 is formed on a surface 32a of the first separator 32 oriented in the direction indicated by the arrow A1. The coolant flow field 52 is connected to the coolant supply passage 48 and the coolant discharge passage 50. A plurality of inlet connection grooves 54a are formed between the coolant supply passages 48 and the coolant flow field 52. A plurality of outlet connection grooves 54b are formed between the coolant flow field 52 and the coolant discharge passages 50. Further, a seal member 55 is provided on the surface 32a of the first separator 32, around the coolant supply passages 48, the coolant discharge passages 50, the coolant flow field 52, the inlet connection grooves 54a, and the outlet connection grooves 54b, and provides sealing between the inside and the outside of the seal member 55 in the surface direction.

Figure 4:
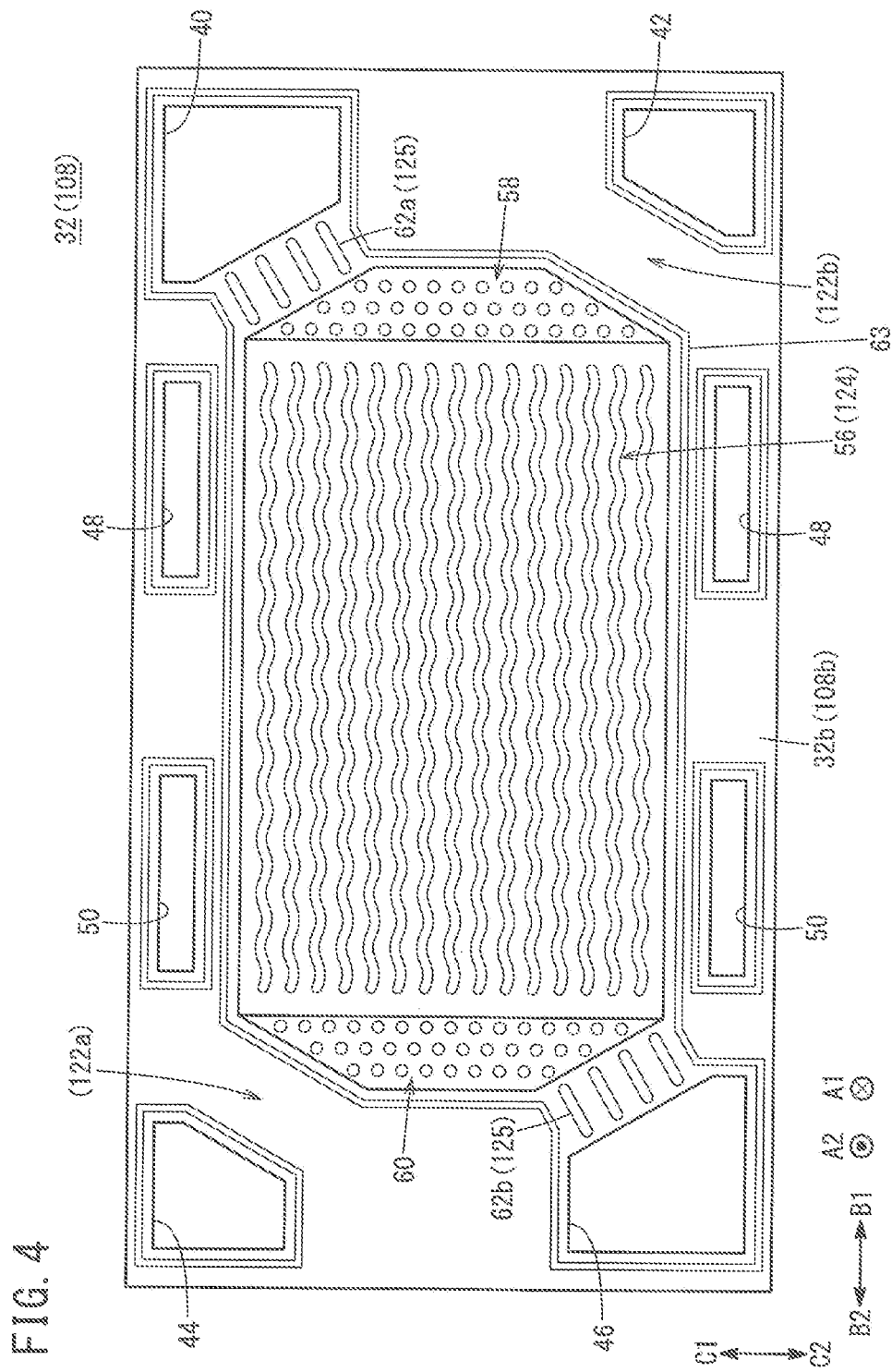
FIG. 4 is a front view showing an oxygen-containing gas flow field of a first separator.

As shown in FIG. 4, the first separator 32 has an oxygen-containing gas flow field 56 on its surface 32b oriented in the direction indicated by the arrow A2. The oxygen-containing gas flow field 56 is connected to the oxygen-containing gas supply passage 40 and the oxygen-containing gas discharge passage 46. The oxygen-containing gas flow field 56 includes a plurality of wavy flow grooves (or straight flow grooves) arranged in parallel.

An oxygen-containing gas inlet buffer 58 is connected to an inlet end of the oxygen-containing gas flow field 56, at a position outside the power generation area, and an oxygen-containing gas outlet buffer 60 is connected to an outlet end of the oxygen-containing gas flow field 56 at a position outside the power generation area.

A plurality of inlet connection grooves 62a are formed between the oxygen-containing gas inlet buffer 58 and the oxygen-containing gas supply passage 40. A plurality of outlet connection grooves 62b are formed between the oxygen-containing gas outlet buffer 60 and the oxygen-containing gas discharge passage 46. Further, a seal member 63 is provided on the surface 32b of the first separator 32, around the oxygen-containing gas supply passage 40, the oxygen-containing gas discharge passage 46, the oxygen-containing gas flow field 56, the oxygen-containing gas inlet buffer 58, the oxygen-containing gas outlet buffer 60, the inlet connection grooves 62a, and the outlet connection grooves 62b, and provides sealing between the inside and the outside of the seal member 63 in the surface direction.

In the first separator 32, the back surface of the oxygen-containing gas flow field 56 forms part of the coolant flow field 52 (see FIGS. 2 and 3).

As shown in FIG. 3, the second separator 36 has a fuel gas flow field 66 on its surface 36a oriented in the direction indicated by the arrow A1. The fuel gas flow field 66 is connected to the fuel gas supply passage 44 and the fuel gas discharge passage 42. The fuel gas flow field 66 includes a plurality of wavy flow grooves (or straight flow grooves) arranged in parallel.

A fuel gas inlet buffer 68 is connected to the inlet end of the fuel gas flow field 66, outside the power generation area, and a fuel gas outlet buffer 70 is connected to the outlet end of the fuel gas flow field 66, outside the power generation area. A plurality of fuel gas supply holes 72a are provided between the fuel gas inlet buffer 68 and the fuel gas supply passage 44. The fuel gas supply holes 72a pass through the second separator 36 in the thickness direction. A plurality of fuel gas discharge holes 72b are formed between the fuel gas outlet buffer 70 and the fuel gas discharge passage 42. The fuel gas discharge holes 72b pass through the second separator 36 in the thickness direction.

A seal member 73 is provided on the surface 36a of the second separator 36, around the fuel gas flow field 66, the fuel gas inlet buffer 68, the fuel gas outlet buffer 70, the fuel gas supply holes 72a, the fuel gas discharge holes 72b, and provides sealing between the inside and the outside of the seal member 73 in the surface direction.

Figure 5:
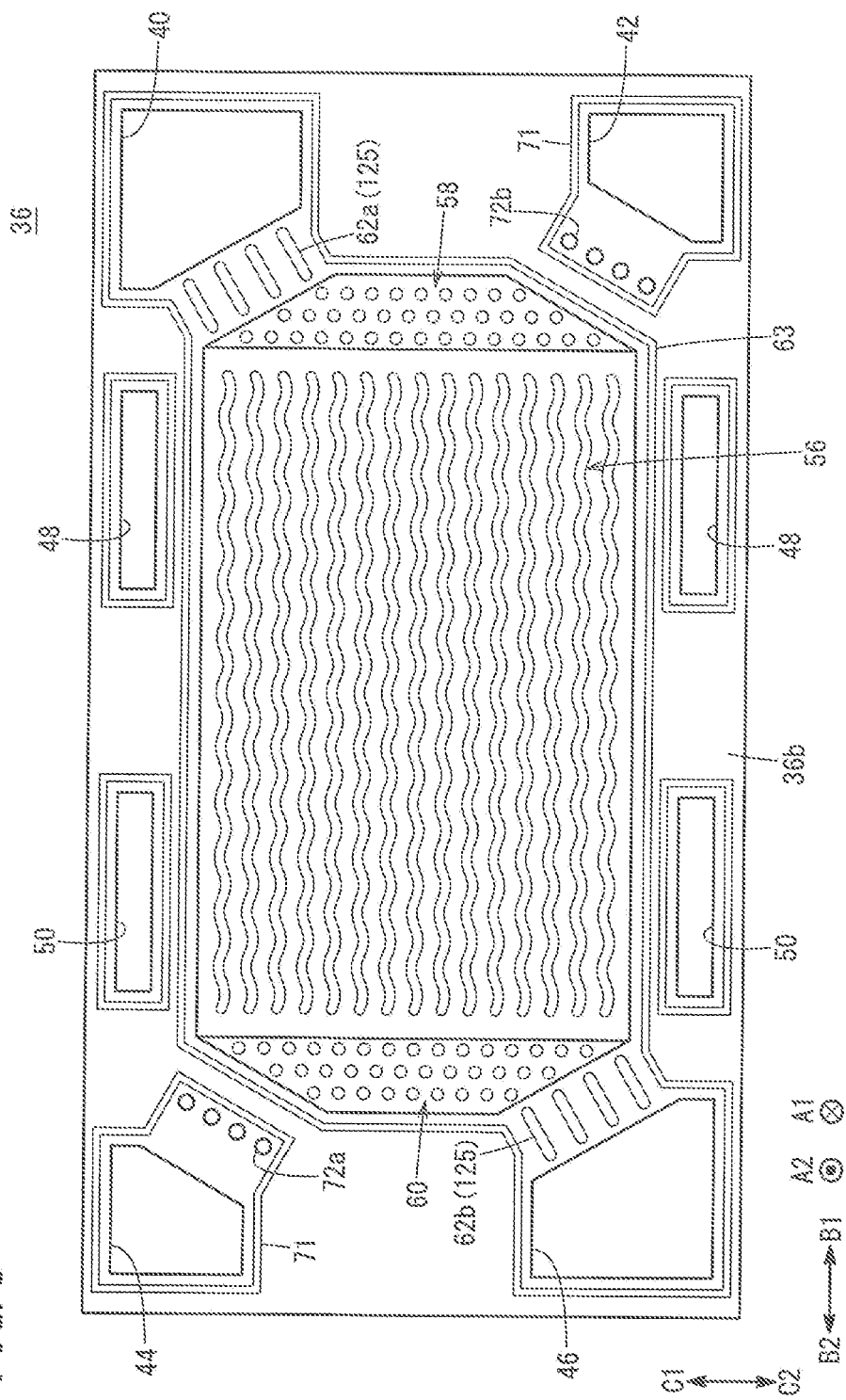
FIG. 5 is a front view showing an oxygen-containing gas flow field of a second separator.

As shown in FIG. 5, the surface 36b of the second separator 36 oriented in the direction arrow A2 has the same structure as the surface 32b of the first separator 32 (see FIG. 4) oriented in the direction indicated by the arrow A2, except that fuel gas supply holes 72a and fuel gas discharge holes 72b surrounded by the seal members 71 are provided. That is, the oxygen-containing gas flow field 56 is formed on the surface 36b of the second separator 36. The oxygen-containing gas flow field 56 is connected to the oxygen-containing gas supply passage 40 and the oxygen-containing gas discharge passage 46. Further, an oxygen-containing gas inlet buffer 58, an oxygen-containing gas outlet buffer 60, inlet connection grooves 62a, outlet connection grooves 62b, and a seal member 63 are formed on the surface 36b of the second separator 36.

On the surface 36b of the second separator 36, the fuel gas supply holes 72a and the fuel gas discharge holes 72b are disconnected from the oxygen-containing gas inlet buffer 58 and the oxygen-containing gas outlet buffer 60 by the seal members 63, 71.

As shown in FIG. 3, the surface 38a of the third separator 38 oriented toward the arrow A1 has the same structure as the surface 36a of the second separator 36 oriented toward the arrow A1. That is, the fuel gas flow field 66 is formed on the surface 38a of the third separator 38. The fuel gas flow field 66 is connected to the fuel gas supply passage 44 and the fuel gas discharge passage 42. Further, the fuel gas inlet buffer 68, the fuel gas outlet buffer 70, the fuel gas supply holes 72a, the fuel gas discharge holes 72b, and the seal member 73 are formed on the surface 38a of the third separator 38.

Figure 6:
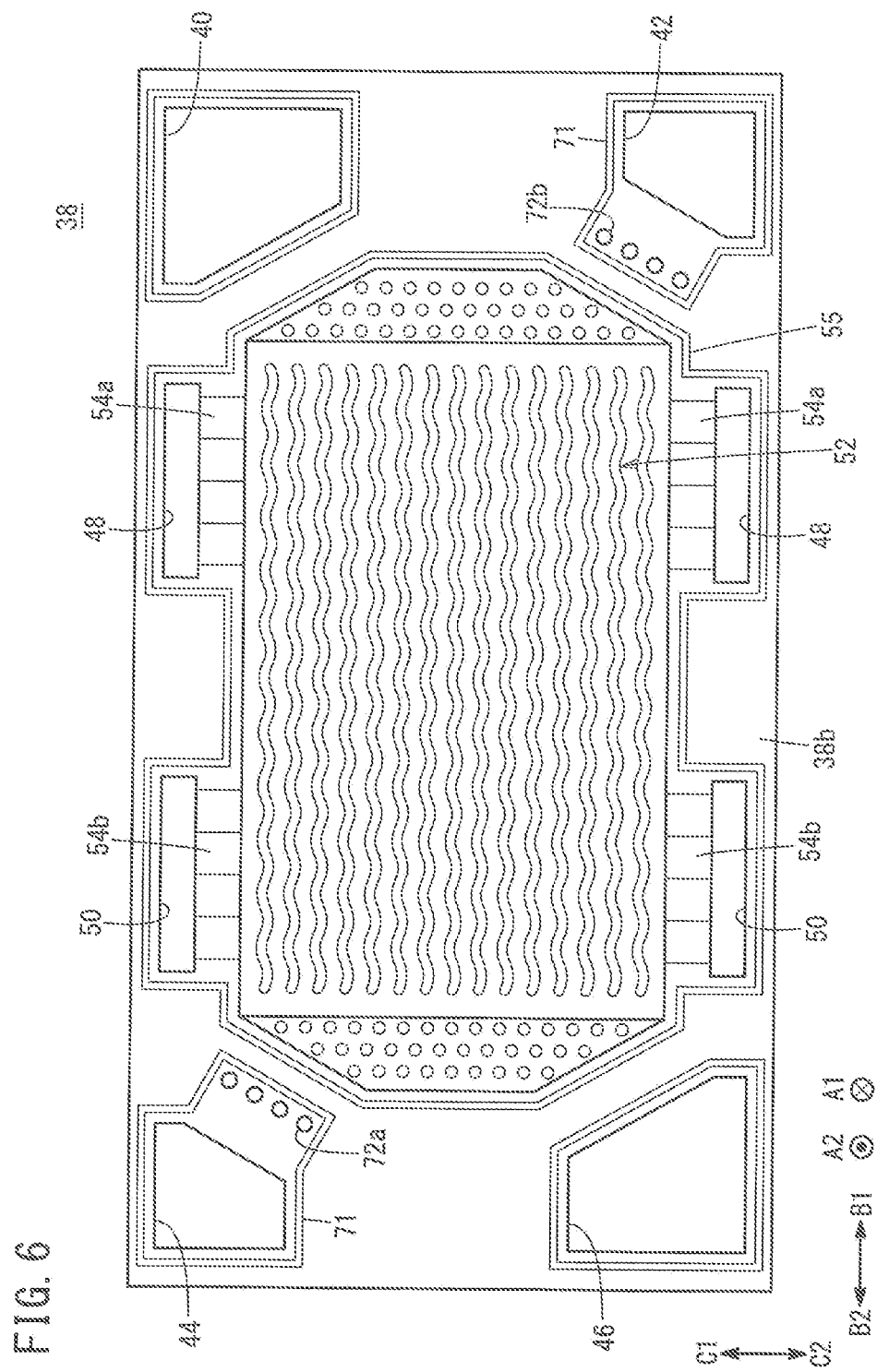
FIG. 6 is a front view showing a coolant flow field of a third separator.

As shown in FIG. 6, the surface 38b of the third separator 38 oriented in the direction arrow A2 has the same structure as the surface 32a of the first separator 32 oriented in the direction indicated by the arrow A1 (see FIG. 3), except that the fuel gas supply holes 72a and the fuel gas discharge holes 72b surrounded by the seal member 71 are provided. That is, the coolant flow field 52, the inlet connection grooves 54a, the outlet connection grooves 54b, and the seal member 55 are provided on the surface 38*b* of the third separator 38. On the surface 38*b* of the third separator 38, each of the fuel gas supply holes 72*a* and the fuel gas discharge holes 72*b* is disconnected from the coolant flow field 52, the inlet connection grooves 54*a*, the outlet connection grooves 54*b*, etc., by the seal members 55, 71.

As shown in FIG. 2, the coolant can flow between the coolant flow field 52 on the surface 38*b* of the third separator 38 in the direction indicated by the arrow A2 and the coolant flow field 52 on the surface 32*a* of the first separator 32 in the direction indicated by the arrow A1 that are adjacent to each other.

As shown in FIGS. 3, 5, and 6, in the second separator 36 and the third separator 38, since the seal members 71, 73 are provided as described above, after the fuel gas flows the fuel gas supply passage 44 from the side indicated by the arrow A1 to the side indicated by the arrow A2, the fuel gas flows through the fuel gas supply holes 72*a* from the side indicated by the arrow A2 to the side indicated by the arrow A1, and then, flows into the fuel gas inlet buffer 68 and the fuel gas flow field 66. Further after the fuel gas flows the fuel gas flow field 66, and flows into the fuel gas outlet buffer 70, the fuel gas flows through the fuel gas discharge holes 72*b* from the side indicated by the arrow A1 to the side indicated by the arrow A2, and then, flows the fuel gas discharge passage 42 from the side indicated by the arrow A2 to the side indicated by the arrow A1.

A seal member (not shown) is formed integrally with each of both surfaces of the separators. The seal member is made of elastic material, and provided around the outer marginal portion of each separator.

Figure 7:
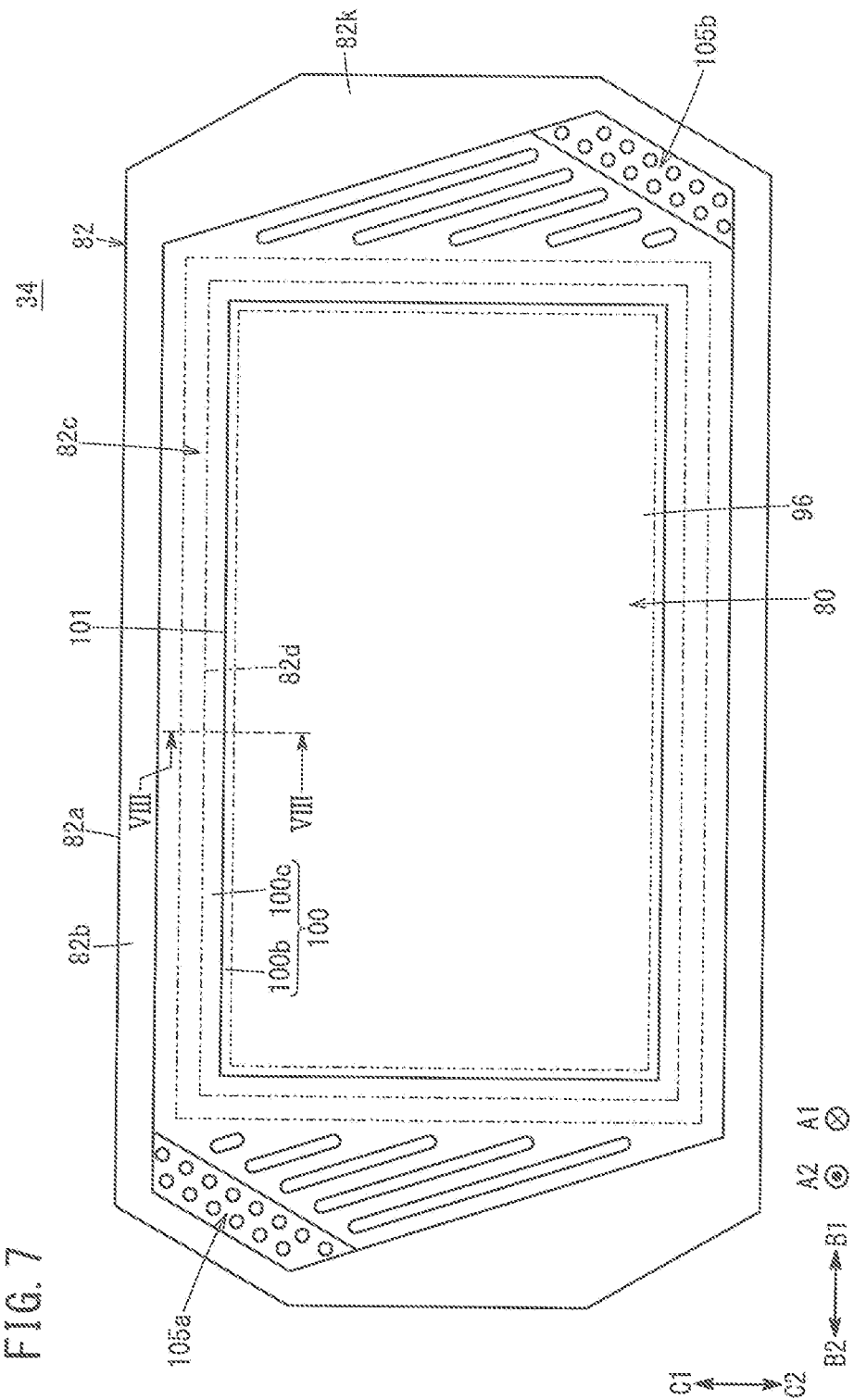
FIG. 7 is a front view showing an anode of a resin frame equipped MEA.
Figure 8:
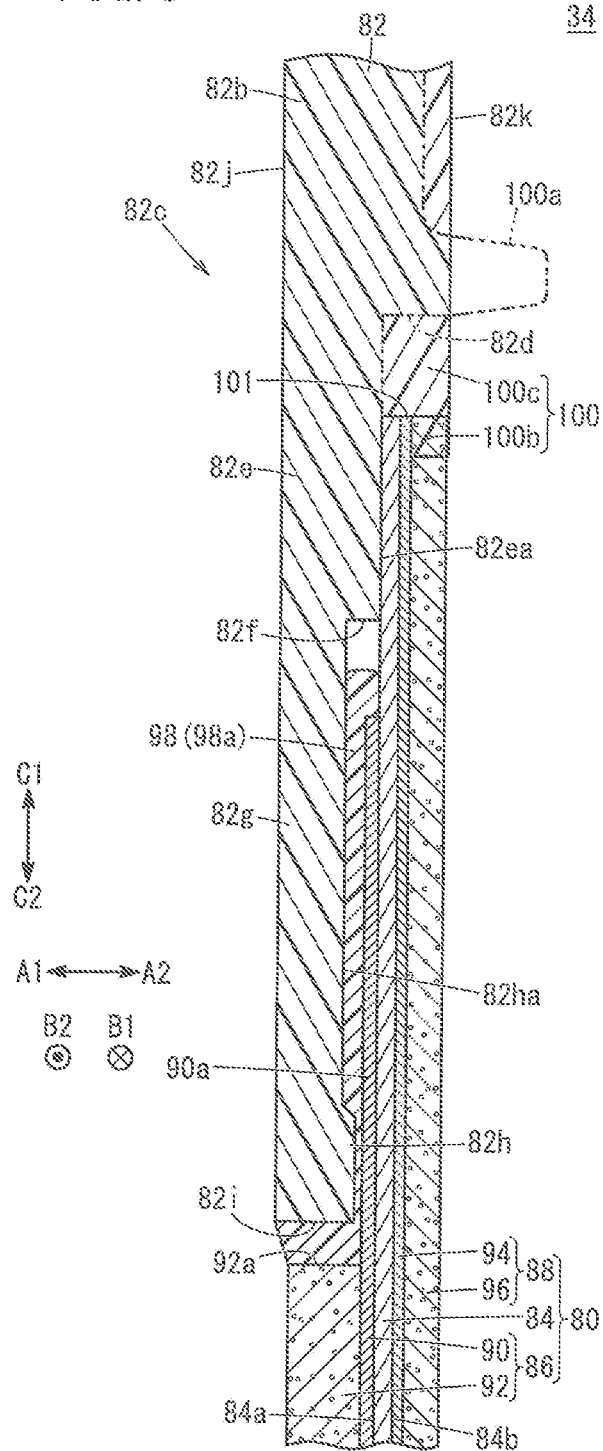
FIG. 8 is a cross sectional view taken along a line VIII-VIII in FIG. 7.

As shown in FIGS. 3, 7, and 8, the resin frame equipped MEA 34 is formed by joining a resin frame member 82 on the outer end of the membrane electrode assembly (MEA) 80. As shown in FIG. 8, the membrane electrode assembly 80 includes a solid polymer electrolyte membrane (hereinafter simply also referred to as the electrolyte membrane) 84 which is a thin membrane of perfluorosulfonic acid containing water, for example. A fluorine based electrolyte may be used as the electrolyte membrane 84. Alternatively, an HC (hydrocarbon) based electrolyte may be used as the electrolyte membrane 84. The electrolyte membrane 84 is interposed between a cathode 86 and an anode 88.

The membrane electrode assembly 80 is an MEA having different sizes of components where the surface size of the cathode 86 is smaller than the surface sizes of the anode 88 and the electrolyte membrane 84. The cathode 86, the anode 88, and the electrolyte membrane 84 may have the same surface size. Alternatively, the surface size of the anode 88 may be smaller than the surface sizes of the cathode 86 and the electrolyte membrane 84.

The cathode 86 includes a first electrode catalyst layer 90 joined to one end surface 84*a* of the electrolyte membrane 84 (indicated by the arrow A1) and a first gas diffusion layer 92 stacked on the first electrode catalyst layer 90. The surface size of the first electrode catalyst layer 90 is larger than the surface size of the first gas diffusion layer 92, and includes an outer exposed portion 90*a* protruding outward from an outer end surface 92*a* of the first gas diffusion layer 92. The surface size of the first electrode catalyst layer 90 is smaller than the surface size of the electrolyte membrane 84.

The anode 88 includes a second electrode catalyst layer 94 joined to the other end surface 84*b* of the electrolyte membrane 84 (indicated by the arrow A2) and a second gas diffusion layer 96 stacked on the second electrode catalyst layer 94. The second electrode catalyst layer 94 and the second gas diffusion layer 96 have the same surface size which is equal to (or less than) the surface size of the electrolyte membrane 84.

For example, the first electrode catalyst layer 90 is formed by porous carbon particles deposited uniformly on the surface of the first gas diffusion layer 92 together with an ion conductive polymer binder and platinum alloy supported on the porous carbon particles. For example, the second electrode catalyst layer 94 is formed by porous carbon particles deposited uniformly on the surface of the second gas diffusion layer 96 together with an ion conductive polymer binder and platinum alloy supported on the porous carbon particles.

Each of the first gas diffusion layer 92 and the second gas diffusion layer 96 is formed of electrically conductive porous body such as carbon paper or carbon cloth, etc. The surface size of the second gas diffusion layer 96 is larger than the surface size of the first gas diffusion layer 92.

For example, the resin frame member 82 is made of resin material such as PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the resin material may be made of a film, etc.

As shown in FIG. 3, the resin frame member 82 has a frame shape, and the resin frame member 82 is provided inside a group of fluid passages 40, 42, 44, 46, 48, 50 including the oxygen-containing gas supply passage 40. The fluid passages 40, 42, 44, 46, 48, 50 are not formed in the resin frame member 82. Further, as shown in FIG. 8, the resin frame member 82 includes an outer marginal portion 82*b* over the predetermined length inside the outer end 82*a* (see FIG. 7), and an inner expansion 82*c* inside the outer marginal portion 82*b*.

The inner expansion 82*c* includes a shelf 82*e* extending inward from the inner end of the outer marginal portion 82*b* through the first stepped surface 82*d*, and a thin portion 82*g* extending inward from the inner end of the shelf 82*e* through a second stepped surface 82*f*. The shelf 82*e* is thinner than the outer marginal portion 82*b*, and the thin portion 82*g* is thinner than the shelf 82*e*. Further, the first stepped surface 82*d*, the shelf 82*e*, the second stepped surface 82*f*, and the thin portion 82*g* are provided over the entire periphery of the resin frame member 82. The outer marginal portion of the surface 84*b* of the electrolyte membrane 84 contacts the surface 82*ea* of the shelf 82*e* oriented in the direction indicated by the arrow A2. At the inner end of the thin portion 82*g*, a bank 82*h* facing the outer exposed portion 90*a* of the first electrode catalyst layer 90 is provided over the entire periphery. Further, a groove 82*ha* is provided between the bank 82*h* and the second stepped surface 82*f*.

Adhesive 98*a* is filled onto the surface 84*a* of the electrolyte membrane 84 adjacent to the groove 82*ha* and the outer exposed portion 90*a* of the first electrode catalyst layer 90, around the outer exposed portion 90*a* to form an adhesive portion 98. Further, the adhesive 98*a* of this adhesive portion 98 is filled between the inner end surface 82*i* of the resin frame member 82 and the outer end surface 92*a* of the first gas diffusion layer 92. As the adhesive 98*a*, for example, fluorocarbon resin, silicone resin, epoxy resin, etc. can be used suitably. However, the present invention is not limited in this respect. The adhesive 98*a* is not limited to adhesive in the liquid or solid state, thermoplastic resin, thermosetting resin, etc.

The resin frame member 82 and the outer marginal portion of the second gas diffusion layer 96 are joined together by a first joint part 100 using adhesive resin. As shown in FIG. 7, the first joint part 100 is provided around the outer end of the second gas diffusion layer 96. As shown in FIG. 8, for example, the first joint part 100 is formed by thermally deforming a resin projection 100*a* which is formed integrally with the resin frame member 82 in a manner that the resin projection 100*a* is provided around the inner end of the outer marginal portion 82*b*, and protrudes in the direction indicated by the arrow A2. The first joint part 100 includes a first resin impregnation portion 100*b* and a first molten and solidified portion 100*c*.

The first resin impregnation portion 100*b* is formed by impregnating the outer marginal portion of the second gas diffusion layer 96 with molten resin of the resin projection 100*a*. In the state where the first stepped surface 82*d* of the resin frame member 82 is spaced from an outer end surface 101 of the electrolyte membrane 84 and the anode 88, molten resin projection 100*a* is supplied into, and solidified between the first stepped surface 82*d* of the resin frame member 82 and the outer end surface 101 of the electrolyte membrane 84 and the anode 88 to form the first molten and solidified portion 100*c*. In FIG. 8, the surface of the shelf 82*e* and the first stepped surface 82*d* formed integrally with the first molten and solidified portion 100*c* are denoted by a two dot chain line.

The adhesive portion 98 is provided around the outer exposed portion 90*a* of the first electrode catalyst layer 90 and the outer end surface 92*a* of the first gas diffusion layer 92. The first joint part 100 is provided around the outer marginal portion of the second gas diffusion layer 96 to prevent cross leakage, etc. between the cathode 86 and the anode 88.

As shown in FIG. 3, an oxygen-containing gas inlet buffer 102*a* and an oxygen-containing gas outlet buffer 102*b* are provided on a surface 82*j* of the resin frame member 82 facing the cathode 86 (oriented in the direction indicated by the arrow A1). As shown in FIG. 7, a fuel gas inlet buffer 105*a* and a fuel gas outlet buffer 105*b* are provided on a surface 82*k* of the resin frame member 82 facing the anode 88 (oriented in the direction indicated by the arrow A2).

As shown in FIG. 2, the first end power generation unit 16 is formed by stacking a resin frame equipped dummy assembly 106 on the first separator 32, a dummy first separator 108 on the resin frame equipped dummy assembly 106, the resin frame equipped MEA 34 on the dummy first separator 108, and the third separator 38 on the resin frame equipped MEA 34, from the side indicated by the arrow A1 to the side indicated by the arrow A2.

Figure 9:
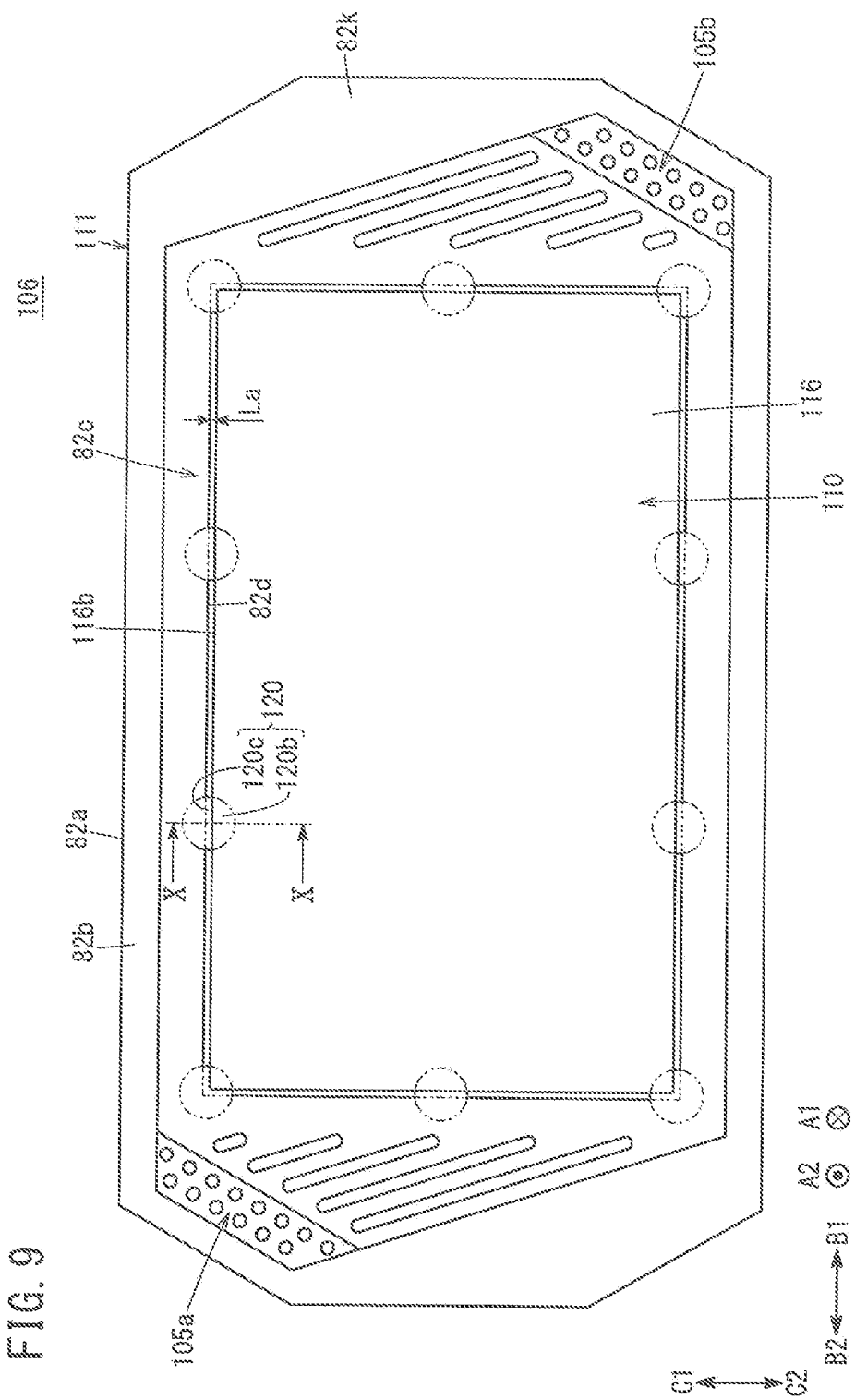
FIG. 9 is a front view showing a third electrically conductive porous body of a resin frame equipped dummy assembly.
Figure 10:
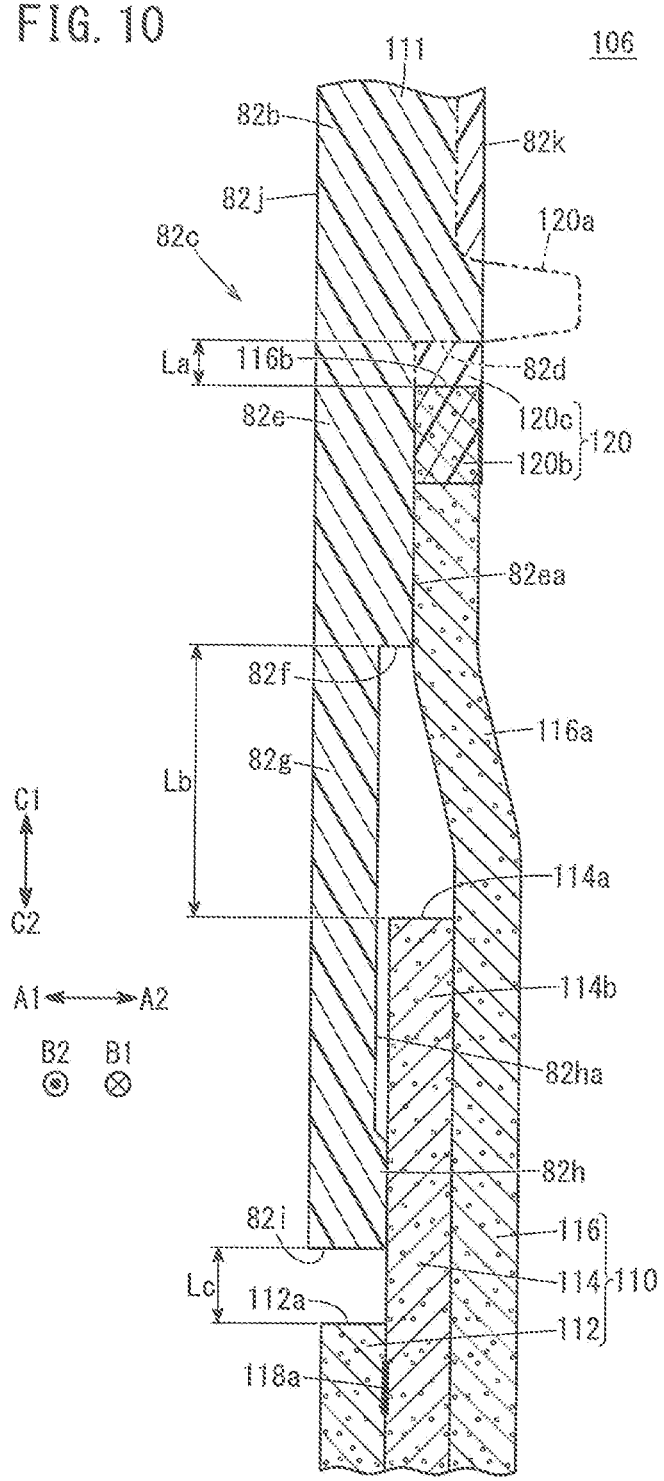
FIG. 10 is a cross sectional view taken along a line X-X in FIG. 9.
Figure 11:
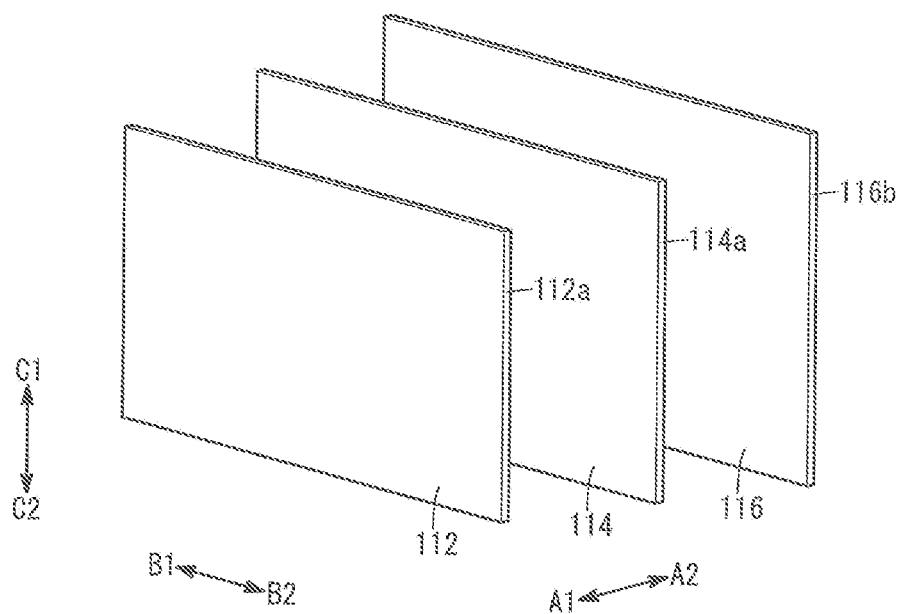
FIG. 11 is an exploded perspective view showing a dummy assembly.
Figure 12:
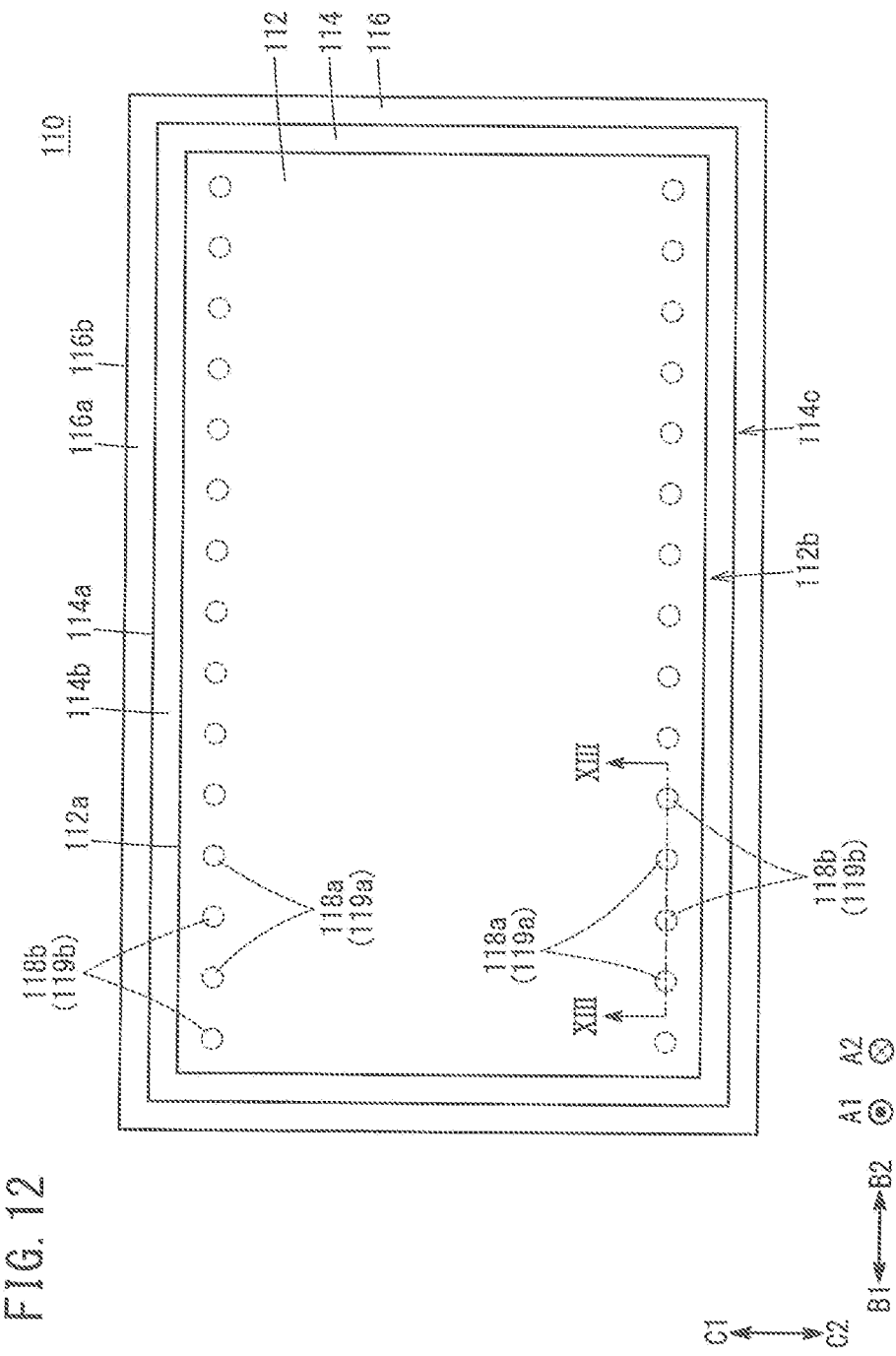
FIG. 12 is a front view showing a first electrically conductive porous body of the dummy assembly.

As shown in FIGS. 9 and 10, the resin frame equipped dummy assembly 106 is formed by joining a dummy resin frame member 111 on the outer end of the dummy assembly 110. As shown in FIGS. 10, 11, and 12, the dummy assembly 110 is formed by stacking three electrically conductive porous bodies having different surface sizes (surface areas/outer sizes) together, to include, from the arrow A1 to the arrow A2, a first electrically conductive porous body 112, a second electrically conductive porous body 114 stacked on the first electrically conductive porous body 112, and a third electrically conductive porous body 116 stacked on the second electrically conductive porous body 114. With regard to the surface sizes, the following relationship is present: First electrically conductive porous body 112<Second electrically conductive porous body 114<Third electrically conductive porous body 116.

Therefore, as shown in FIGS. 10 and 12, an outer exposed portion 116*a* is provided in the outer marginal portion of the third electrically conductive porous body 116. The outer exposed portion 116*a* protrudes outward beyond an outer end surface 114*a* of the second electrically conductive porous body 114 over the entire periphery. The outer exposed portion 114*b* is provided in the outer marginal portion of the second electrically conductive porous body 114. The outer exposed portion 114*b* protrudes outward beyond the outer end surface 112*a* of the first electrically conductive porous body 112 over the entire periphery.

The first electrically conductive porous body 112, the second electrically conductive porous body 114, and the third electrically conductive porous body 116 are made of the same material, and may be made of the material which is used for the electrically conductive porous body of the first gas diffusion layer 92 or the second gas diffusion layer 96.

Further, in the embodiment of the present invention, the first electrically conductive porous body 112, the second electrically conductive porous body 114, and the third electrically conductive porous body 116 have the same thickness as the electrically conductive porous body of the second gas diffusion layer 96. In this manner, by adjusting the surface size of the electrically conductive porous body, it becomes possible to obtain the dummy assembly 110 more easily.

Figure 13:
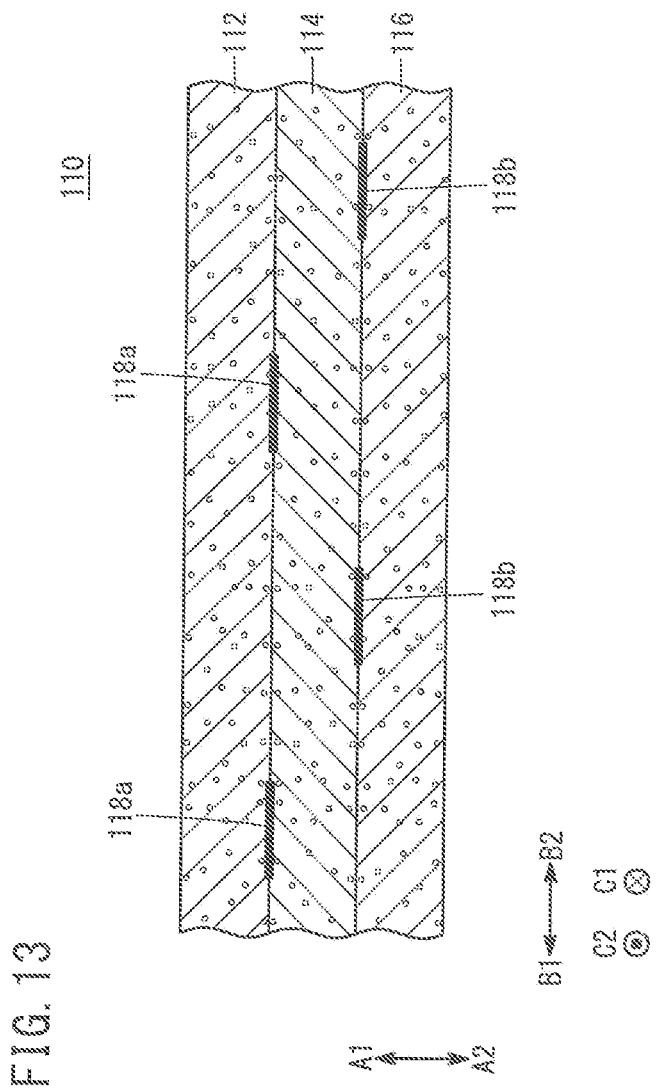
FIG. 13 is a cross sectional view taken along a line XIII-XIII in FIG. 12.

As shown in FIGS. 12 and 13, the first electrically conductive porous body 112 and the second electrically conductive porous body 114 that are stacked together are joined together by a first joint layer 118*a* interposed between the first electrically conductive porous body 112 and the second electrically conductive porous body 114. The second electrically conductive porous body 114 and the third electrically conductive porous body 116 are joined together by a second joint layer 118*b* interposed between the second electrically conductive porous body 114 and the third electrically conductive porous body 116. As described later, the first joint layer 118*a* and the second joint layer 118*b* are formed by hardening the first adhesive layer 119*a* and the second adhesive layer 119*b*, respectively. The adhesive 98*a* may be used as material of the first adhesive layer 119*a* and the second adhesive layer 119*b*.

As shown in FIG. 12, the first joint layer 118*a* is provided discontinuously (in a spot pattern) in the long side of a first stack part 112*b* as a stack part of the first electrically conductive porous body 112 and the second electrically conductive porous body 114. Further, the second joint layer 118*b* is provided discontinuously (in a spot pattern) in the long side of a second stack part 114*c* as a stack part of the second electrically conductive porous body 114 and the third electrically conductive porous body 116. Further, the first joint layer 118*a* and the second joint layer 118*b* are provided alternately in the direction (indicated by the arrows B1, B2) in which the long sides of the first stack part 112*b* and the second stack part 114*c* extend.

As shown in FIG. 13, the first joint layer 118*a* and the second joint layer 118*b* are provided at different positions in the stacking direction (indicated by the arrows A1 and A2).

As shown in FIGS. 9 and 10, the dummy resin frame member 111 has the same structure as the resin frame member 82 of the resin frame equipped MEA 34 in FIGS. 7 and 8, and includes an outer marginal portion 82*b* and an inner expansion 82*c*. As shown in FIG. 10, the outer exposed portion 116*a* of the third electrically conductive porous body 116 on the side indicated by the arrow A1 contacts the shelf 82*e* of the inner expansion 82*c*. In this regard, an outer end surface 116b of the third electrically conductive porous body 116 is spaced form the first stepped surface 82d by the distance La.

Part of the outer exposed portion 116a of the third electrically conductive porous body 116 on the side indicated by the arrow A1 and part of the outer exposed portion 114b of the second electrically conductive porous body 114 on the side indicated by the arrow A1 are positioned adjacent to the thin portion 82g. In this regard, the outer end surface 114a of the second electrically conductive porous body 114 is spaced from the second stepped surface 82f by the distance Lb. The outer exposed portion 114b of the second electrically conductive porous body 114 on the side indicated by the arrow A1 contacts the protruding end surface of the bank 82h. In the direction indicated by the arrows A1, A2, the outer end surface 114a of the second electrically conductive porous body 114 is positioned between the third electrically conductive porous body 116 and the thin portion 82g. The height of the second stepped surface 82f is smaller than the thickness of the second electrically conductive porous body 114.

In the direction indicated by arrows C1, C2 perpendicular to the stacking direction (indicated by the arrows A1, A2), an inner end surface 82i of the dummy resin frame member 111 is positioned between the outer end surface 114a of the second electrically conductive porous body 114 and the outer end surface 112a of the first electrically conductive porous body 112. The outer end surface 112a of the first electrically conductive porous body 112 is spaced from the inner end surface 82i of the dummy resin frame member 111 by the distance Lc. The above distances La, Lb, Lc have the following relationship: La<Lc<Lb.

The distance La may have the same value over the entire outer end surface 116b of the third electrically conductive porous body 116 in the peripheral direction, or may change depending on the portion in the peripheral direction, as long as the relationship of La<Lc<Lb is satisfied. Therefore, for example, the distance La may change depending on the four sides of the rectangular third electrically conductive porous body 116. The same applies to the distances Lb and Lc. That is, the distance Lb may be have the same value over the entire outer end surface 114a of the second electrically conductive porous body 114 in the peripheral direction, or may change depending on the portion in the peripheral direction. The distance Lc may be have the same value over the entire outer end surface 112a of the first electrically conductive porous body 112 in the peripheral direction, or may change depending on the portion in the peripheral direction.

The outer exposed portion 116a of the third electrically conductive porous body 116 and the surface 82ea of the shelf 82e of the dummy resin frame member 111 on the side indicated by the arrow A2 are joined together through the second joint part 120 (impregnation joint part) to form the resin frame equipped dummy assembly 106. As shown in FIG. 9, the second joint part 120 is provided discontinuously in the peripheral direction, in the outer marginal portion of the third electrically conductive porous body 116. It should be noted that the second joint part 120 may be formed around the dummy assembly 110.

As shown in FIG. 10, the second joint part 120 may be formed by thermally deforming part of the resin projection 120a which is formed integrally with the dummy resin frame member 111 in a manner that the resin projection 120a protrudes in the direction indicated by the arrow A2 around the inner end of the outer marginal portion 82b of the dummy resin frame member 111. In this case, the second joint part 120 includes a second resin impregnation portion 120b and a second molten and solidified portion 120c. It should be noted that portion of the resin projection 120a which does not form the second joint part 120, i.e., the remaining portion of the resin protrusion which has not been thermally deformed may be eliminated by machining, etc.

The second resin impregnation portion 120b is formed by impregnating an outer marginal portion of the third electrically conductive porous body 116 with molten resin of the resin projection 120a. In the state where the first stepped surface 82d of the dummy resin frame member 111 is spaced from the outer end surface 116b of the third electrically conductive porous body 116, the second molten and solidified portion 120c is formed by supplying, and solidifying molten resin of the resin projection 120a between the first stepped surface 82d of the dummy resin frame member 111 and the outer end surface 116b of the third electrically conductive porous body 116. In FIG. 10, the surface of the shelf 82e and the first stepped surface 82d formed integrally with the second molten and solidified portion 120c are denoted by a two dot chain line.

It should be noted that the first joint part 100 and the second joint part 120 may be formed by melting a resin piece (not shown) which is separate from the resin frame member 82 and the dummy resin frame member 111, instead of the resin projections 100a, 120e, and impregnating the second gas diffusion layer 96 and the outer marginal portion of the third electrically conductive porous body 116 with the molten resin of the resin piece. As in the case of the adhesive portion 98, the adhesive 98a may be used for the first joint part 100 and the second joint part 120.

Figure 14:
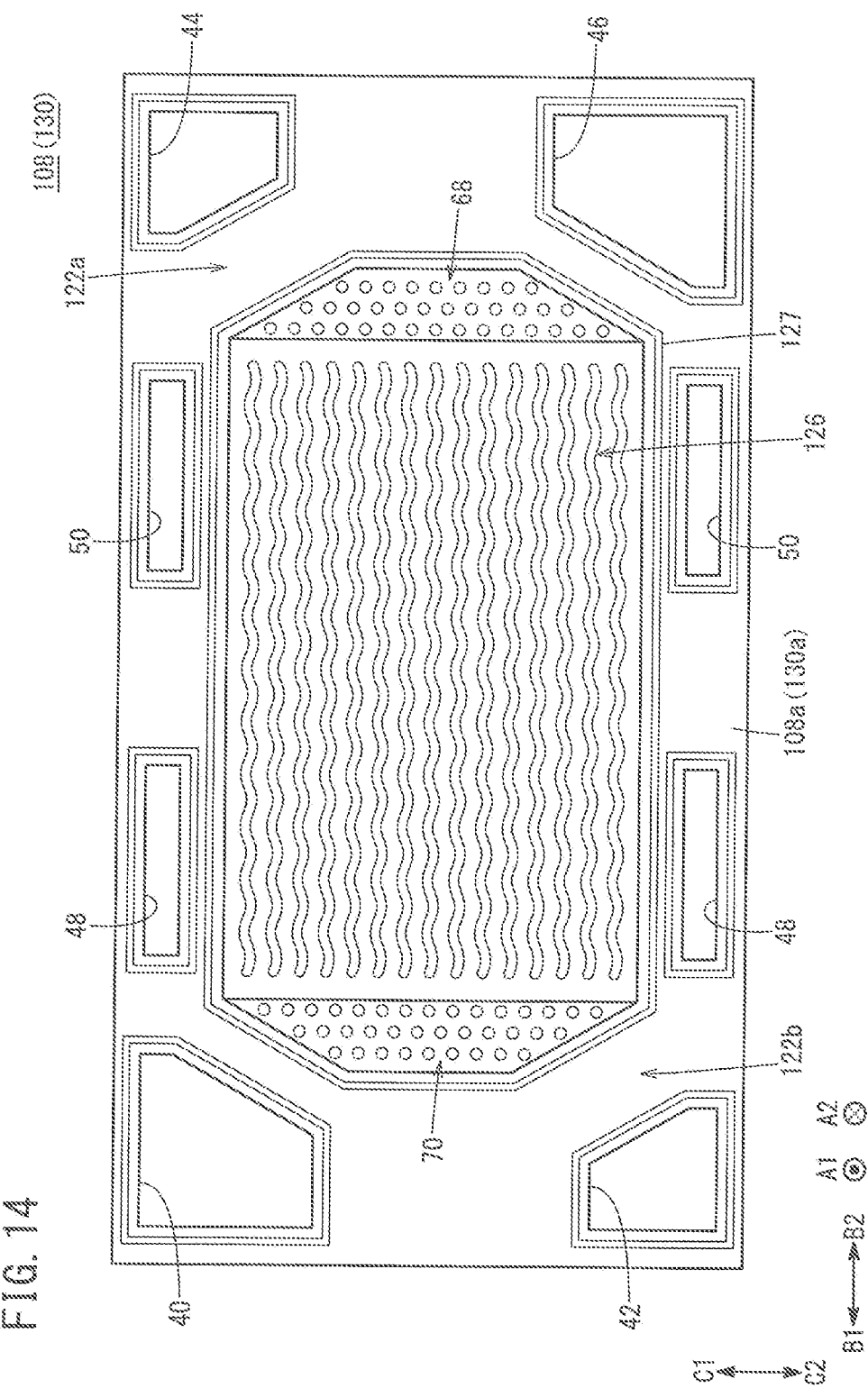
FIG. 14 is a front view showing second space of a dummy first separator and a dummy second separator.

As shown in FIGS. 2, 3, and 14, the dummy first separator 108 has the same structure as the second separator 36 except that an inlet blocking part 122a is provided instead of the fuel gas supply holes 72a, and an outlet blocking part 122b is provided instead of the fuel gas discharge holes 72b. That is, the surface 108b at the other end of the dummy first separator 108 (oriented in the direction indicated by the arrow A2) has the same structure as the surface 32b at the other end of the first separator 32 shown in FIG. 4 (oriented in the direction indicated by the arrow A2).

As shown in FIGS. 2 and 4, first space 124 corresponding to the oxygen-containing gas flow field 56 is provided between the surface 108b of the dummy first separator 108 at the other end (indicated by the arrow A2) and the resin frame equipped MEA 34 (on the side closer to the cathode 86 indicated by the arrow A1). The first space 124 is connected to the oxygen-containing gas supply passage 40 and the oxygen-containing gas discharge passage 46 through a connection channel 125 formed inside the inlet connection grooves 62a and the outlet connection grooves 62b. Therefore, the oxygen-containing gas can flow the first space 124, like the oxygen-containing gas flow field 56.

As shown in FIGS. 2 and 14, second space 126 corresponding to the fuel gas flow field 66 is provided between the surface 108a at one end of the dummy first separator 108 (oriented in the direction indicated by the arrow A1) and the resin frame equipped dummy assembly 106 on the side closer to the third electrically conductive porous body 116 (oriented in the direction indicated by the arrow A2). The second space 126 is disconnected from the fuel gas supply passage 44 by the inlet blocking part 122a, and the second space 126 is disconnected from fuel gas discharge passage 42 by the outlet blocking part 122b. That is, since the flow of the fuel gas in the second space 126 is restricted by the inlet blocking part 122a and the outlet blocking part 122b (hereinafter, the inlet blocking part 122a and the outlet blocking part 122b are also referred to as the blocking part collectively), heat insulating space is formed inside the second space 126.

Only one of the inlet blocking part 122a and the outlet blocking part 122b may be provided to restrict the flow of the fuel gas in the second space 126, and form the heat insulating space. Further, in the embodiment of the present invention, the blocking part may be formed, e.g., by making the fuel gas supply holes 72a and the fuel gas discharge holes 72b which do not pass through the dummy first separator 108 beforehand (see FIG. 3). However, the present invention is not limited in this respect. For example, the blocking part may be formed by making the fuel gas supply holes 72a and the fuel gas discharge holes 72b which pass through the dummy first separator 108 and thereafter, closing the fuel gas supply holes 72a and the fuel gas discharge holes 72b. As shown in FIG. 14, a seal member 127 is provided on the surface 108a of the dummy first separator 108 around the second space 126 to provide sealing between the inside and the outside of the seal member 127 in the surface direction.

As shown in FIG. 2, the first dummy cell 18 includes, from the side indicated by the arrow A1 to the side indicated by the arrow A2, the first separator 32 (dummy separator), the resin frame equipped dummy assembly 106 stacked on the first separator 32, the dummy first separator 108 (dummy separator) stacked on the resin frame equipped dummy assembly 106, the resin frame equipped dummy assembly 106 stacked on the dummy first separator 108, and the dummy second separator 130 (dummy separator) stacked on the resin frame equipped dummy assembly 106.

As shown in FIGS. 2, 3, and 14, the dummy second separator 130 has the same structure as the third separator 38 except that an inlet blocking part 122a is provided instead of the fuel gas supply holes 72a, and an outlet blocking part 122b is provided instead of the fuel gas discharge holes 72b.

That is, as shown in FIGS. 2, 3, and 6, the surface 130b at the other end of the dummy second separator 130 (on the side indicated by the arrow A2) has the same structure as the surface 38b of the third separator 38 on the side indicated by the arrow A2, except that the fuel gas supply holes 72a and the fuel gas discharge holes 72b around the seal member 71 are not provided. Therefore, the surface 130b of the dummy second separator 130 may have has the same structure as the surface 32a at one end of the first separator 32 (on the side indicated by the arrow A1) shown in FIG. 3. Further, as shown in FIGS. 2 and 14, the surface 130a of the dummy second separator 130 on the side indicated by the arrow A1 has the same structure as the surface 108a of the dummy first separator 108 on the side indicated by the arrow A1.

As shown in FIG. 2, in the first dummy cell 18, a coolant flow field 52 is provided between the surface 130b of the dummy second separator 130 oriented in the direction indicated by the arrow A2 and the first separator 32 of the first end power generation unit 16. As shown in FIG. 2, in the first dummy cell 18, the second space 126 corresponding to the fuel gas flow field 66 is provided between the surface 130a of the dummy second separator 130 oriented in the direction indicated by the arrow A1 and the third electrically conductive porous body 116 (FIG. 11) of the resin frame equipped dummy assembly 106 (oriented in the direction indicated by the arrow A2).

The second dummy cell 20 includes, from the side indicated by the arrow A1 to the side indicated by the arrow A2, a first separator 32 (dummy separator), a resin frame equipped dummy assembly 106 stacked on the first separator 32, and a dummy second separator 130 (dummy separator) stacked on the resin frame equipped dummy assembly 106. Therefore, in the second dummy cell 20, second space 126 is provided between the surface 130a of the dummy second separator 130 in the direction indicated by the arrow A1 and the third electrically conductive porous body 116 of the resin frame equipped dummy assembly 106 (on the side indicated by the arrow A2). The third dummy cell 24 has the same structure as the second dummy cell 20.

The second end power generation unit 22 includes, from the side indicated by the arrow A1 to the side indicated by the arrow A2, the first separator 32, the resin frame equipped MEA 34 stacked on the first separator 32, the second separator 36 stacked on the resin frame equipped MEA 34, the resin frame equipped dummy assembly 106 stacked on the second separator 36, and the dummy second separator 130 stacked on the resin frame equipped dummy assembly 106. Therefore, in the second end power generation unit 22, the second space 126 is formed between the surface 130a of the dummy second separator 130 on the side indicated by the arrow A1 and the third electrically conductive porous body 116 of the resin frame equipped dummy assembly 106 (on the side indicated by the arrow A2).

The terminal plates 26a, 26b are made of electrically conductive material. For example, the terminal plates 26a, 26b are made of metal such as copper, aluminum, or stainless steel. As shown in FIG. 1, terminals 132a, 132b are provided at substantially central positions of the terminal plates 26a, 26b. The terminal plates 26a, 26b protrude outward in the stacking direction.

The terminal 132a is inserted into an insulating cylinder 134a to pass through a hole 136a of the insulator 28a and a hole 138a of the end plate 30a. The terminal 132a protrudes to the outside of the end plate 30a. The terminal 132b is inserted into an insulating cylinder 134b to pass through a hole 136b of the insulator 28b and a hole 138b of the end plate 30b. The terminal 132b protrudes to the outside of the end plate 30b.

The insulators 28a, 28b are made of electrically insulating resin such as polycarbonate (PC) resin, phenol resin, etc. Recesses 140a, 140b, opened to the stack body 14 are formed at the centers of the insulators 28a, 28b. The recesses 140a, 140b are connected to holes 136a, 136b.

Reactant gas passages are formed in the insulator 28a and the end plate 30a. A coolant supply passage 48 and a coolant discharge passage 50 are formed in the insulator 28b and the end plate 30b.

The terminal plate 26a and heat insulating body 142 are accommodated in the recess 140a. A terminal plate 26b and a heat insulating body 142 are accommodated in the recess 140b. The heat insulating body 142 is formed by sandwiching an electrically conductive heat insulating member 146 between a pair of electrically conductive heat insulating plates 144. For example, the heat insulating plate 144 is a flat porous carbon plate, and the heat insulating member 146 is a metal plate having a corrugated shape in cross section.

The heat insulating plate 144 may be made of the same material as that of the heat insulating member 146. Further, the heat insulating body 142 may include one heat insulating plate 144 and one heat insulating member 146. Further, resin spacers (not shown) may be interposed between the terminal plates 26a, 26b and bottoms of the recesses 140a, 140b of the insulators 28a, 28b.

The fuel cell stack 10 basically has the structure as described above. Hereinafter, a method of producing a dummy cell according to an embodiment of the present invention will be described below taking a case where the first dummy cell 18 of the fuel cell stack 10 is obtained as an example.

Firstly, as shown in FIGS. 11 to 13, a first stacking step is performed by stacking the second electrically conductive porous body 114 on the third electrically conductive porous body 116 through the second adhesive layer 119b, and thereafter, stacking the first electrically conductive porous body 112 on the second electrically conductive porous body 114 through the first adhesive layer 119a.

For example, the second adhesive layer 119b is provided on at least one of the third electrically conductive porous body 116 and the second electrically conductive porous body 114. Specifically, the second adhesive layer 119b is provided discontinuously along the long side of the rectangular portion where the second stack part 114c is formed in the case where the third electrically conductive porous body 116 and the second electrically conductive porous body 114 are stacked together. Thereafter, third electrically conductive porous body 116 and the second electrically conductive porous body 114 are stacked together to form the second stack part 114c.

Further, the first adhesive layer 119a is provided on at least one of the second electrically conductive porous body 114 and the first electrically conductive porous body 112. Specifically, in the second electrically conductive porous body 114 and the first electrically conductive porous body 112, the first adhesive layer 119a is provided discontinuously along the long side of the rectangular portion where the first stack part 112b is formed. At this time, the first adhesive layer 119a and the second adhesive layer 119b are provided in a manner that the positions of the first adhesive layer 119a and the second adhesive layer 119b in the stacking direction (indicated by the arrows A1 and A2) are not overlapped with each other. Thereafter, the first electrically conductive porous body 112 is stacked on the second electrically conductive porous body 114 to form the first stack part 112b.

Next, a hardening step is performed by hardening the first adhesive layer 119a and the second adhesive layer 119b for forming the first joint layer 118a and the second joint layer 118b to obtain the dummy assembly 110, respectively. In the hardening step, in the state where the surface pressure having the same pressure which is applied to the fuel cell stack 10 during power generation operation (e.g., about 1.0 to 10.0 MPa) is applied to the first electrically conductive porous body 112, the second electrically conductive porous body 114, and the third electrically conductive porous body 116 stacked in the first stacking step, the first adhesive layer 119a and the second adhesive layer 119b are hardened to form the first joint layer 118a and the second joint layer 118b.

Next, as shown in FIGS. 9 and 10, a resin frame joining step is performed by providing the dummy resin frame member 111 around the dummy assembly 110 obtained in the hardening step to obtain the resin frame equipped dummy assembly 106.

Specifically, the outer exposed portion 116a of the third electrically conductive porous body 116 on the side indicated by the arrow A1 is overlapped with the shelf 82e of the dummy resin frame member 111, and the outer exposed portion 114b of the second electrically conductive porous body 114 is positioned adjacent to the thin portion 82g of the dummy resin frame member 111, and the outer end surface 112a of the first electrically conductive porous body 112 is positioned to face the inner end surface 82i of the dummy resin frame member 111. The dummy assembly 110 and the dummy resin frame member 111 are positioned in a manner that the distance between the outer end surface 116b of the third electrically conductive porous body 116 and the first stepped surface 82d of the dummy resin frame member 111 becomes La over the entire periphery. Further, the outer exposed portion 114b of the second electrically conductive porous body 114 on the side indicated by the arrow A1 is brought into contact with the protruding end surface of the bank 82h.

Further, the resin projection 120a provided in the dummy resin frame member 111 is heated by a heating device (not shown), and the resin projection 120a is molten, and deformed to form the second joint part 120 including the second resin impregnation portion 120b and the second molten and solidified portion 120c. Therefore, by joining the shelf 82e of the dummy resin frame member 111 and the outer marginal portion of the third electrically conductive porous body 116, it is possible to obtain the resin frame equipped dummy assembly 106.

After the two resin frame equipped dummy assembly 106 is obtained as described above, as shown in FIG. 2, a second stacking step is performed by stacking the resin frame equipped dummy assembly 106 on the first separator 32, stacking the dummy first separator 108 on the resin frame equipped dummy assembly 106, stacking the resin frame equipped dummy assembly 106 on the dummy first separator 108, and stacking the dummy second separator 130 on the resin frame equipped dummy assembly 106. In this manner, it is possible to obtain the first dummy cell 18.

The second dummy cell 20 and the third dummy cell 24 can be obtained by sandwiching the resin frame equipped dummy assembly 106 between the first separator 32 and the dummy second separator 130. The separators which can be used as the second dummy cell 20 and the third dummy cell 24 are not limited to have the above structure. For example, the second dummy cell 20 may be formed by stacking the dummy first separator 108 on the resin frame resin frame equipped dummy assembly 106 on the side indicated by the arrow A1, and stacking the first separator 32 on the resin frame equipped dummy assembly 106 on the side indicated by the arrow A2. Further, third dummy cell 24 may be formed by stacking the first separator 32 on the resin frame equipped dummy assembly 106 on the side indicated by the arrow A1, and stacking the dummy first separator 108 on the resin frame equipped dummy assembly 106 on the side indicated by the arrow A2.

Operation of the fuel cell stack 10 having the first dummy cell 18, the second dummy cell 20, and the third dummy cell 24 obtained as described above will be described below. Firstly, as shown in FIG. 1, an oxygen-containing gas is supplied to the oxygen-containing gas supply passage 40 of the end plate 30a. A fuel gas such as a hydrogen-containing gas is supplied to the fuel gas supply passage 44 of the end plate 30a. A coolant such as pure water ethylene glycol, or oil is supplied to the coolant supply passages 48 of the end plate 30b.

As shown in FIGS. 4 and 5, the oxygen-containing gas supplied to the oxygen-containing gas supply passage 40 flows into the oxygen-containing gas flow field 56 and the first space 124 through the connection channel 125 formed inside the inlet connection grooves 62a. Thus, the oxygen-containing gas flows in the longitudinal direction indicated by the arrows B1 and B2, and the oxygen-containing gas is supplied to the cathode 86 of the membrane electrode assembly 80 and the dummy assembly 110.

As shown in FIG. 3, the fuel gas supplied to the fuel gas supply passage 44 flows into the fuel gas flow field 66 of the second separator 36 and the third separator 38 through the fuel gas supply holes 72a. Therefore, the fuel gas flows in the direction indicated by the arrows B1 and B2, and the fuel gas is supplied to the anode 88 of the membrane electrode assembly 80. In the meanwhile, as shown in FIG. 14, the flow of the fuel gas into the second space 126 of the dummy first separator 108 and the dummy second separator 130 is blocked by the inlet blocking part 122a.

In the membrane electrode assembly 80 to which the reactant gases are supplied as described above, the oxygen-containing gas supplied to each cathode 86 and the fuel gas supplied to each anode 88 are consumed in electrochemical reactions in the first electrode catalyst layer 90 and the second electrode catalyst layer 94 to generate electricity.

Then, after the oxygen-containing gas is supplied to each cathode 86, and some of the oxygen-containing gas is consumed at the cathode 86, the oxygen-containing gas is discharged from each of the oxygen-containing gas flow field 56 and the first space 124 to the oxygen-containing gas discharge passage 46 through the connection channel 125 formed inside the outlet connection grooves 62b. Then, the oxygen-containing gas is discharged to the outside of the fuel cell stack 10 through the oxygen-containing gas discharge passage 46 of the end plate 30a.

Likewise, after the fuel gas is supplied to each anode 88, and some of the fuel gas is supplied from the fuel gas flow field 66 to the fuel gas discharge passage 42 through the inside of the fuel gas discharge holes 72b. Then, the fuel gas is discharged to the outside of the fuel cell stack 10 through the fuel gas discharge passage 42 of the end plate 30a.

In this regard, the flow of the fuel gas between the second space 126 and the fuel gas discharge passage 42 is blocked by the outlet blocking part 122b. Therefore, as described above, the flow of the fuel gas into the second space 126 is blocked by the inlet blocking part 122a, and entry of the fuel gas from the fuel gas discharge passage 42 into the second space 126 is avoided by the outlet blocking part 122b. As a result, in the second space 126, the flow of the fuel gas is blocked by the blocking part. Thus, the second space 126 functions as heat insulating space.

Further, the coolant supplied to each of the coolant supply passages 48 flows into the coolant flow field 52 between the dummy second separator 130 and the first separator 32 that are adjacent to each other, and the coolant flow field 52 between the third separator 38 and the first separator 32 that are adjacent to each other. The coolant which flowed from each of the coolant supply passages 48 on the side in the direction indicated by the arrow C1 and the coolant which flowed from the coolant supply passage 48 on the side indicated by the arrow C2 flow toward each other, in the direction indicated by the arrows C1 and C2, and then, flow in the direction indicated by the arrow B2, and move away from each other in the direction indicated by the arrows C1 and C2 while cooling the membrane electrode assembly 80. The coolant is discharged through each of the coolant discharge passages 50.

As described above, each of the dummy cells (the first dummy cell 18, the second dummy cell 20, the third dummy cell 24) of the fuel cell stack 10 according to the embodiment of the present invention includes the dummy assembly 110 in correspondence with the membrane electrode assembly 80 of the power generation cell 12. That is, since each of the dummy cells does not include the electrolyte membrane 84, the first electrode catalyst layer 90, and the second electrode catalyst layer 94, power generation is not performed, and thus, no water is produced as a result of power generation. Therefore, each of the dummy cells itself functions as a heat insulating layer, and it is possible to suppress water condensation in each of the dummy cells.

Since the first dummy cell 18 and the second dummy cell 20 are provided at one end of the stack body 14 in the direction indicated by the arrow A1, and the third dummy cell 24 is provided at the other end of the stack body 14 in the direction indicated by the arrow A2, it is possible to improve the heat insulating performance at the end of the stack body 14. Therefore, even in the environment at low temperature, it is possible to suppress decrease in the temperature at the ends of the stack body 14 in comparison with the central position of the stack body 14.

Further, since it is possible to improve the heat insulating performance at the ends of the stack body 14 as describe above, even in the case of starting operation of the fuel cell stack 10 below the freezing temperature, it is possible to effectively increase the temperature of the entire stack body 14. Therefore, it is possible to suppress decrease in the voltage due to freezing of the produced water, etc. at the ends of the stack body 14, and decrease in the voltage.

In the dummy assembly 110 of each of dummy cells, the position of the first joint layer 118a joining the first electrically conductive porous body 112 and the second electrically conductive porous body 114 and the position of the second joint layer 118b joining the second electrically conductive porous body 114 and the third electrically conductive porous body 116 in the stacking direction are different from each other. In the structure, in comparison with the case where the first joint layer 118a and the second joint layer 118b are provided at the same position in the staking direction, it is possible to partially suppress increase in the thickness of each of the dummy cells. Even if the dummy cells are stacked on the power generation cell 12, it is possible to suppress local increase in the surface pressure in the power generation cell 12, and thus, it is possible suppress degradation of the durability of the electrolyte membrane 84, e.g., due to creeps in the electrolyte membrane 84.

As described above, in the fuel cell stack 10, since each of the dummy cells can be stacked on the power generation cell 12 while suppressing local increase in the surface pressure, it becomes possible to improve power generation stability without degrading durability of the electrolyte membrane 84.

As described above, in the fuel cell stack 10, the first joint layer 118a is provided discontinuously in the marginal portion of the first stack part 112b, and the second joint layer 118b is provided discontinuously in the marginal portion of the second stack part 114c. In comparison with the case of providing the first joint layer 118a and the second joint layer 118b continuously in the marginal portions of the first stack part 112b and the second stack part 114c, since it is possible to obtain the dummy assembly 110 in the simple step, improvement in the production efficiency of the fuel cell stack 10 is achieved.

As described above, in the fuel cell stack 10, the first joint layer 118a and the second joint layer 118b are provided alternately in the peripheral direction of the first stack part 112b and the second stack part 114c. In this case, it is possible to join the first electrically conductive porous body 112, the second electrically conductive porous body 114, and the third electrically conductive porous body 116 in the simple joining step with the sufficient strength. Further, it becomes possible to effectively suppress local increase in the surface pressure in the power generation cell 12 stacked on each of the dummy cells.

As described above, in the fuel cell stack 10, each of the first electrically conductive porous body 112, the second electrically conductive porous body 114, and the third electrically conductive porous body 116 have a rectangular surface, and the first joint layer 118a and the second joint layer 118b are provided on the long sides excluding the short sides of the rectangular surface. In this case, since increase in the internal resistance is suppressed by each of the dummy cells stacked on the power generation cell 12, it becomes possible to include each of the dummy cells in the fuel cell stack 10 without causing any influence on the power generation performance.

In the above hardening step, in the state where the surface pressure equal to the surface pressure applied during power generation operation of the fuel cell stack 10 is applied to the first electrically conductive porous body 112, the second electrically conductive porous body 114, and the third electrically conductive porous body 116 which have been stacked together in the first stacking step, the first adhesive layer 119a and the second adhesive layer 119b are hardened. In the state where the surface pressure is applied in this manner, in each of the dummy cells forming the first joint layer 118a and the second joint layer 118b, when the dummy cells are assembled in the fuel cell stack 10, it is possible to suppress the local increase in the surface pressure of the power generation cells 12 to a greater extent.

As described above, the resin frame equipped dummy assembly 106 of each of the dummy cells has the relationship of the surface sizes: the first electrically conductive porous body 112<the second electrically conductive porous body 114<the third electrically conductive porous body 116, and has the relationship of the distances La, Lb, Lc: La<Lc<Lb.

As described above, the distance La between the outer end surface 116b of the third electrically conductive porous body 116 having the largest surface size and the first stepped surface 82d of the dummy resin frame member 111 is smaller than the other distances Lb, Lc. Therefore, at the time of providing the dummy resin frame member 111 around the dummy assembly 110, since it is possible to position the dummy assembly 110 and the dummy resin frame member 111 in correspondence with the small distance La as described above, it is possible to improve the positioning accuracy. In this manner, it becomes possible to obtain each of the dummy cells with high quality in the simple step.

As described above, the second electrically conductive porous body 114 is interposed between the first electrically conductive porous body 112 and the third electrically conductive porous body 116. Therefore, in the resin frame equipped dummy assembly 106, it is not easy to confirm the positional relationship between the outer end surface 114a of the second electrically conductive porous body 114 and the second stepped surface 82f of the dummy resin frame member 111 visually, or using image processing, etc. in comparison with the positional relationship between the outer end surface 112a of the first electrically conductive porous body 112 and the inner end surface 82i of the dummy resin frame member 111.

Even in the case of providing the dummy resin frame member 111 around such dummy assembly 110, the distance Lb is larger than the distance Lc as described above. Therefore, by spacing the outer end surface 112a of the first electrically conductive porous body 112 from the inner end surface 82i of the dummy resin frame member 111 by the distance Lc, it is possible to avoid interference (contact) between the outer end surface 114a of the second electrically conductive porous body 114 and the second stepped surface 82f of the dummy resin frame member 111. Also in this manner, it is possible to obtain each of the dummy cells with high quality in the simple step.

As described above, the surface size is determined to have the relationship of: the first electrically conductive porous body 112<the second electrically conductive porous body 114<the third electrically conductive porous body 116. Therefore, for example, after the second electrically conductive porous body 114 is stacked on the third electrically conductive porous body 116, the first electrically conductive porous body 112 is stacked on the second electrically conductive porous body 114. In this manner, it is possible to form the dummy assembly 110 while adjusting the positional relationship among the electrically conductive porous bodies 112, 114, 116. That is, at the time of stacking the second electrically conductive porous body 114 on the third electrically conductive porous body 116, it is possible to adjust the distance Lb easily, and at the time of stacking the first electrically conductive porous body 112 on the second electrically conductive porous body 114, it is possible to adjust the distance Lc easily. As a result, it becomes possible to simplify the production process of each of the dummy cells to a greater extent.

As described above, in the fuel cell stack 10, it is possible to improve the power generation stability by each of the dummy cells which can be obtained with high quality in simple steps.

As described above, in each of the power generation cells which does not perform power generation, there is no need to control cross leakage, etc. Therefore, by providing the second joint part 120 discontinuously in the peripheral direction in the outer periphery of the third electrically conductive porous body 116 of the dummy assembly 110, it becomes possible to simplify the joining step of joining the dummy assembly 110 and the dummy resin frame member 111, and improve the production efficiency of the fuel cell stack 10.

Further, as described above, the second resin impregnation portion 120b is provided discontinuously. Therefore, unlike the case of providing the second resin impregnation portion 120b around the outer exposed portion 116a of the third electrically conductive porous body 116, it is possible to reduce the portion heated at the time of deforming (melting) the dummy resin frame member 111. As a result, it is possible to suppress occurrence of warpage, etc. of the dummy resin frame member 111 due to heating.

Further, the second joint part 120 is provided in the outer marginal portion of the third electrically conductive porous body 116, and the second joint part 120 is not provided in the first electrically conductive porous body 112 and the second electrically conductive porous body 114. Also in this respect, it is possible to simplify the joining step of joining the dummy assembly 110 and the dummy resin frame member 111, and suppress occurrence of warpage, etc. of the dummy resin frame member 111 due to heating.

The second joint part 120 includes the second resin impregnation portion 120b where the molten resin projection 120a is impregnated into the third electrically conductive porous body 116. In the structure, in comparison with the dummy resin frame member 111 and the dummy assembly 110 that are joined together using adhesive only between the dummy resin frame member 111 and the dummy assembly 110, it is possible to increase the joining strength of joining the dummy resin frame member 111 and the dummy assembly 110 together. Further, the resin projection 120a is thermally deformed as part of the dummy resin frame member 111 to form the second joint part 120 easily and suitably with simple structure. Therefore, it becomes possible to obtain each of the dummy cells more efficiently.

The present invention shall not be limited to the above described embodiments specially. Various modifications may be made without deviating from the gist of the present invention.

Figure 15:
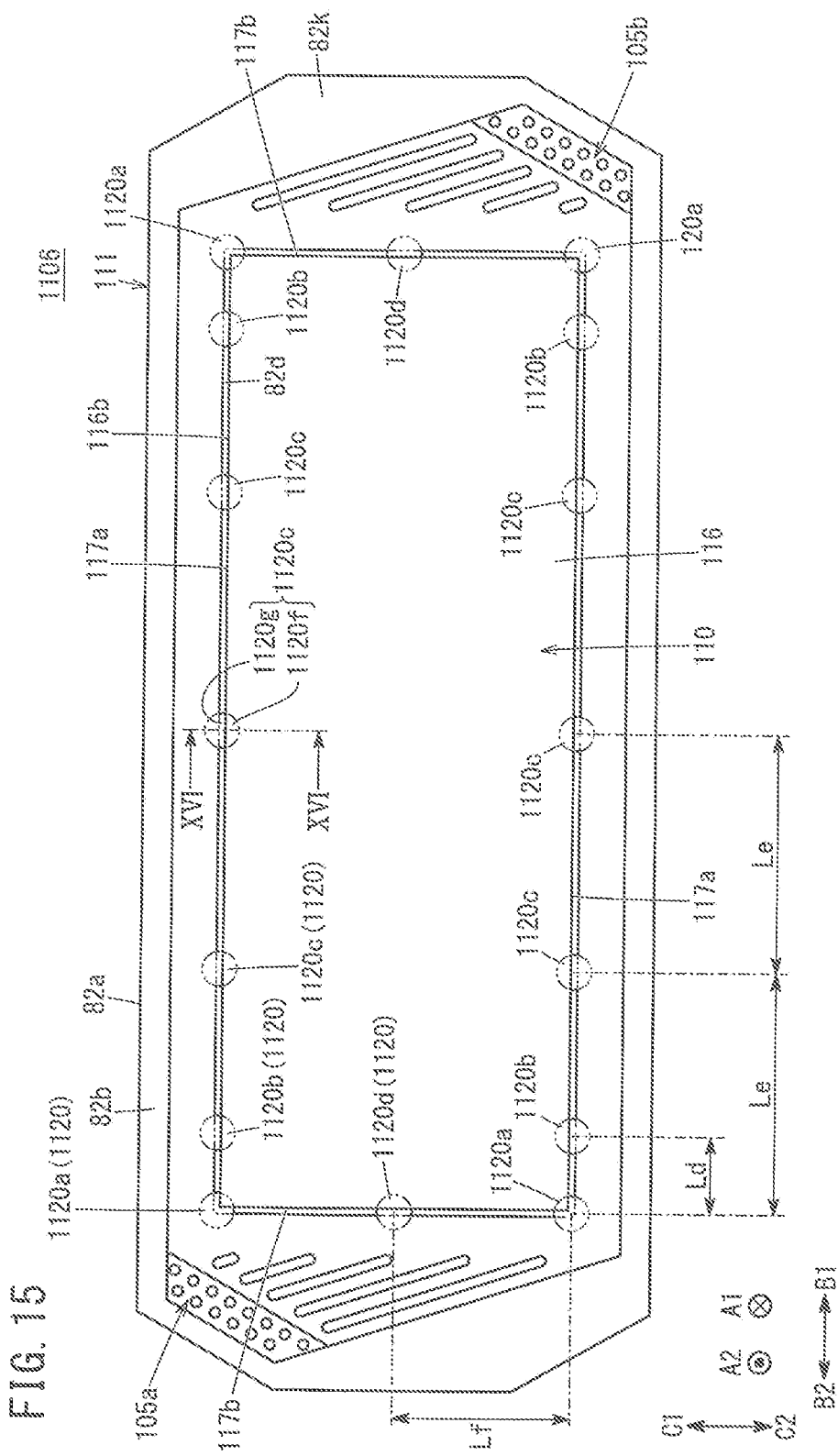
FIG. 15 is a front view showing a third electrically conductive porous body of a resin frame equipped dummy assembly according to a modified embodiment.
Figure 16:
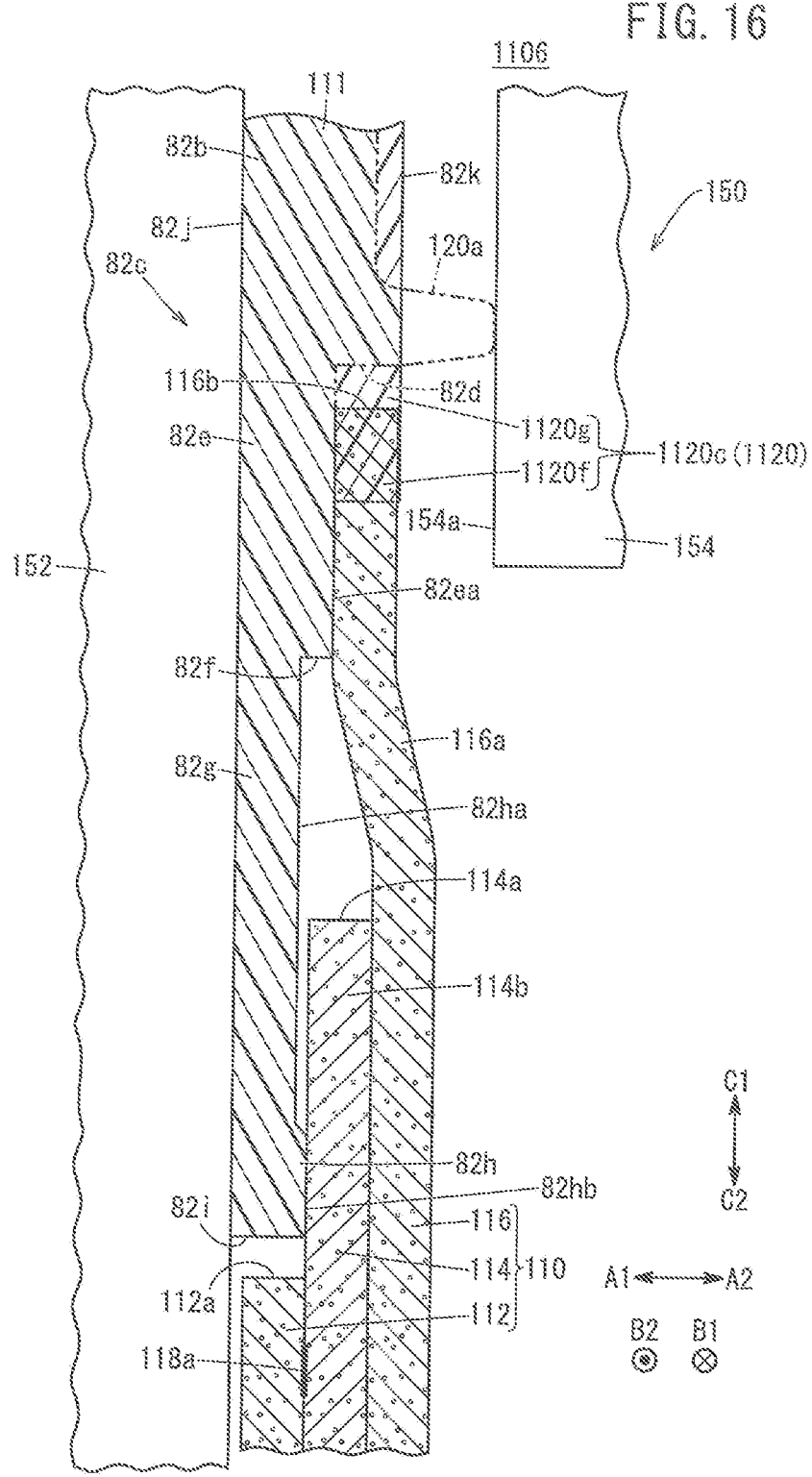
FIG. 16 is a cross sectional view taken along a line XVI-XVI in FIG. 15.

For example, the fuel cell stack 10 may include a resin frame equipped dummy assembly 1106 according to a modified embodiment shown in FIGS. 15 and 16, instead of the above resin frame equipped dummy assembly 106. The second joint part 1120 of the resin frame equipped dummy assembly 1106 includes corner joint parts 1120*a*, adjacent joint parts 1120*b*, long side joint parts 1120*c*, and short side joint parts 1120*d*. The corner joint part 1120*a* is provided at each of corners (four corners) of the third electrically conductive porous body 116. The adjacent joint part 1120*b* is provided at each of positions adjacent to the corner joint parts 1120*a* of the long sides 117*a* of the third electrically conductive porous body 116. The interval between the corner joint part 1120*a* and the adjacent joint part 1120*b* adjacent to the corner joint part 1120*a* is Ld.

The long side joint parts 1120*c* are provided at positions dividing the interval between the corner joint parts 1120*a* of the long side 117*a* of the third electrically conductive porous body 116 into a plurality of long side segments. In the embodiment of the present invention, three long side joint parts 1120*c* are provided between the corner joint parts 1120*a* of each of the long side 117*a* of the third electrically conductive porous body 116 on the side in the direction indicated by the arrow C1 and the long side 117*a* of the third electrically conductive porous body 116 on the side in the direction indicated by the arrow C2. Further, each of the long segments formed between the long side joint parts 1120*c* and between the corner joint parts 1120*a* and the long side joint parts 1120*c* adjacent to the corner joint parts 1120*a* has the same length Le.

The short joint parts 1120*d* are provided at positions dividing the interval between the corner joint parts 1120*a* of the short sides 117*b* of the third electrically conductive porous body 116 into a plurality of short segments. In the embodiment of the present invention, one short side joint part 1120*d* is provided at each position between the corner joint parts 1120*a* of the short side 117*b* of the third electrically conductive porous body 116 in the direction indicated by the arrow B1 and the short side 117*b* of the third electrically conductive porous body 116 in the direction indicated by the arrow B2. Further, each of the short segments formed between the corner joint parts 1120*a* and the short side joint parts 1120*d* adjacent to the corner joint parts 1120*a* has the same length Lf.

The interval Ld between the corner joint part 1120*a* and the adjacent joint part 1120*b* adjacent to the corner joint part 1120*a*, the length Le of the long side segment, and the length Lf of the short segment Lf are determined to satisfy the relationship of Ld<Lf<Le.

A method of producing a dummy cell according to another embodiment will be described taken an example of obtaining a first dummy cell 18 having a resin frame equipped dummy assembly 1106 will be described. Firstly, in the same manner as described in the above embodiment, a first stacking step is performed. Therefore, it is possible to obtain the dummy assembly 110.

Next, the dummy resin frame member 111 is provided around the dummy assembly 110. Specifically, the outer exposed portion 116*a* of the third electrically conductive porous body 116 on the side indicated by the arrow A1 is stacked on the shelf 82*e* of the dummy resin frame member 111, and the outer exposed portion 114*b* of the second electrically conductive porous body 114 is positioned adjacent to the groove 82*ha* of the dummy resin frame member 111. The outer end surface 112*a* of the first electrically conductive porous body 112 is positioned to face the inner end surface 82*i* of the dummy resin frame member 111.

Then, as shown in FIG. 16, the resin projection 120*a* provided for the dummy resin frame member 111 is deformed by heating, and applying a load by a joining device 150 to form the second joint part 1120 including a second resin impregnation portion 1120*f* and a second molten and solidified portion 1120*g*. For example, the joining device 150 includes a base frame (die) 152 and a movable die 154 which can move away from and move closer to the base frame 152. In the embodiment of the present invention, the contact surface 154*a* which contacts the resin projection 120*a* of the movable die 154 has a circular shape. Using the movable die 154, as shown in FIG. 15, the second joint part 1120 having a circular shape in a plan view is formed. However, the shape of the contact surface 154*a* of the movable die 154 and the shape of the second joint part 1120 in a plan view are not limited to the circular shape specifically. For example, the shape of the contact surface 154*a* of the movable die 154 and the shape of the second joint part 1120 in a plan view may be a rectangular shape or another polygonal shape.

As shown in FIG. 16, the dummy assembly 110 on the side adjacent to the first electrically conductive porous body 112 and the surface of the dummy resin frame member 111 indicated by the arrow A1 are placed on the base frame 152. As a result, the resin projection 120*a* is positioned to face the movable die 154.

Next, in the state where the movable die 154 is heated to a predetermined temperature, the movable die 154 is moved closer to the base frame 152, and a contact surface 154*a* of the movable die 154 is brought into contact with the resin projection 120*a* to apply heat and pressure to the resin projection 120*a*. As a result, the molten resin projection 120*a* is expanded in the direction indicated by the arrow C along the contact surface 154*a* of the movable die 154, and the molten resin flows between the first stepped surface 82*d* of the resin frame member 82 and the outer end surface 116*b* of the third electrically conductive porous body 116 to form the second molten and solidified portion 1120*g*. Further, the outer marginal portion of the third electrically conductive porous body 116 is impregnated with the molten resin projection 120*a* to form the second resin impregnation portion 1120*f*.

In this regard, by adjusting the position where the resin projection 120*a* is heated and deformed, the second joint part 1120 is adjusted to have the corner joint part 1120*a*, the adjacent joint part 1120*b*, the long side joint part 1120*c*, and the short side joint part 1120*d*. For example, in terms of making the resin projection 120*a* to be deformable by a small load, preferably, the movable die 154 is moved successively, and the second joint part 1120 is formed to take the above layout. In terms of forming the second joint part 1120 efficiently, preferably, the contact surfaces 154*a* of the movable dies 154 are brought into contact with a plurality of positions of the resin projection 120*a* substantially at the same time, and the second joint part 1120 is formed to take the above layout.

In the case of forming the second joint part 1120 using the above resin piece instead of the resin projection 120*a*, the resin piece should be heated, and pressurized to molten the resin piece by providing the resin piece between the position of the dummy resin frame member 111 and the third electrically conductive porous body 116 where the second joint part 1120 is formed and the contact surface 154a of the movable die 154.

As described above, by performing the resin frame joining step of forming the second joint part 1120, it is possible to join the shelf 82e of the dummy resin frame member 111 and the outer marginal portion of the third electrically conductive porous body 116 to obtain the resin frame equipped dummy assembly 1106.

As described above, in each of the dummy cells which does not perform power generation, there is no need to control cross leakage, etc. Therefore, by providing the second joint part 1120 discontinuously in the peripheral portion of the third electrically conductive porous body 116 of the dummy assembly 110, it is possible to simplify the resin frame joining step of joining the dummy assembly 110 and the dummy resin frame member 111, and obtain each of the dummy cells efficiently.

As described above, though the resin frame joining step is simplified, since the second joint part 1120 includes the corner joint part 1120a and the adjacent joint part 1120b, the sufficient joining strength of joining the dummy assembly 110 and the dummy resin frame member 111 together is achieved. Further, since the second joint part 1120 includes the second resin impregnation portion 1120f formed by impregnating the third electrically conductive porous body 116 with adhesive resin, for example, in comparison with the case where adhesive (not shown) is provided only between the dummy resin frame member 111 and the third electrically conductive porous body 116, it is possible to join the dummy assembly 110 and the dummy resin frame member 111 together with high strength. Accordingly, it is possible to achieve the high quality of each of the dummy cells.

In the case of deforming the resin projection 120a provided for the dummy resin frame member 111 by heating, and applying a load to the resin projection 120a, to form the second joint part 1120, the temperature of the dummy resin frame member 111 around the second joint part 1120 becomes relatively high as well. By providing the second joint part 1120 discontinuously as described above, for example, in comparison with the case of providing the second joint part 1120 around the third electrically conductive porous body 116, it is possible to reduce the area of the dummy resin frame member 111 having high temperature. As a result, since it is possible to suppress warpage, etc. by heating of the dummy resin frame member 111, it is possible to obtain each of the dummy cells with high quality also in this respect.

As described above, in the fuel cell stack 10 having the resin frame equipped dummy assembly 1106 according to the modified embodiment, it is possible to improve the power generation stability by each of the dummy cells obtained with high quality efficiently in the simple step.

Further, as described above, the second joint part 1120 is provided in the outer marginal portion of the third electrically conductive porous body 116, and the second joint part 1120 is not provided in the first electrically conductive porous body 112 and the second electrically conductive porous body 114. Also in this structure, it is possible to simplify the joining step of joining the dummy assembly 110 and the dummy resin frame member 111 together, and suppress warpage, etc. by heating of the dummy resin frame member 111. Further, in this case, an inspecting step for inspecting whether the dummy assembly 110 and the dummy resin frame member 111 are joined together with predetermined joining strength should be performed only in the surface of the resin frame equipped dummy assembly 1106 on the side indicated by the arrow A2. Therefore, for example, it becomes possible to simplify the inspecting step in comparison with the case of conducting the above inspection for each of both surfaces of the resin frame equipped dummy assembly 1106.

As described above, the second joint part 1120 further includes the long side joint parts 1120c, the short side joint parts 1120d, and the length of each of the long side segments Le is larger than the length Lf of each of the short side segments. In the structure, it becomes possible to join the dummy assembly 110 and the dummy resin frame member 111 together not only efficiently, but also with sufficient strength.

As described above, the plurality of the long side segments have the same length Le, and the plurality of short side segments have the same length Lf. Further, the interval Ld between the corner joint part 1120a and the adjacent joint part 1120b adjacent to the corner joint part 1120a, the length Le of the long side segment, the length Lf of the short side segment satisfy the relationship of: Ld<Lf<Le. In this case, it is possible to simplify the resin frame joining step of joining the dummy assembly 110 and the dummy resin frame member 111, and increase the joining strength of joining the dummy assembly 110 and the dummy resin frame member 111 together, and obtain each of the dummy cells with high quality.

As described above, in the simple step where the resin projection 120a is molten as part of the dummy resin frame member 111, and the third electrically conductive porous body 116 is impregnated with the molten resin of the resin projection 120a, it is possible to form the second joint part 1120 suitably and efficiently. It is possible to efficiently obtain each of the dummy cells with the increased strength of joining the dummy assembly 110 and the dummy resin frame member 111 together.

It should be noted that the numbers and the layout of the long side joint parts 1120c and the short side joint parts 1120d are not limited specifically, and can be determined suitably, e.g., depending on the lengths of the long side 117a and the short side 117b of the third electrically conductive porous body 116, and the diameter, etc. of the second joint part 1120. Further, the plurality of long segments may not have the same length, and the plurality of short segments may not have the same length.

As long as the first joint layer 118a and the second joint layer 118b are provided at different positions in the stacking direction, the shapes and the number of the first joint layer 118a and the second joint layer 118b, and other layout relative to the first stack part 112b and the second stack part 114c are not limited to those described in the above described embodiment. For example, the first joint layer 118a and the second joint layer 118b may be provided in both of the long sides and the short sides of the first stack part 112b and the second stack part 114c, or may be provided in only the short sides of the first stack part 112b and the second stack part 114c. The first joint layer 118a and the second joint layer 118b may not be necessarily provided in the first stack part 112b and the second stack part 114c. The first joint layer 118a and the second joint layer 118b may be provided at the central position, or may be provided in both of the outer marginal position and the central position.

Further, the first joint layer 118a and the second joint layer 118b may not be provided alternately with the first stack part 112b and the second stack part 114c, or may be provided successively.

In the fuel cell stack 10 according to the above embodiment, the first end power generation unit 16, the first dummy cell 18, and the second dummy cell 20 are stacked on the stack body 14 on the side indicated by the arrow A1, and the second end power generation unit 22 and the third dummy cell 24 are stacked on the stack body 14 on the side indicated by the arrow A2.

As described above, the number of dummy cells provided on the stack body 14 on the side indicated by the arrow A1, i.e., at the inlet of the oxygen-containing gas is larger than the number of the dummy cells provided on the stack body 14 on the side indicated by the arrow A2, i.e., at the outlet of the oxygen-containing gas. In the structure, it is possible to suppress entry of the condensed water into the power generation cell 12 effectively to a greater extent. However, as long as the fuel cell stack 10 includes the dummy cell on at least one side of the stack body 14 in the stacking direction, the number of the dummy cells is not limited specially.

Further, the first end power generation unit 16 or the second end power generation unit 22 is interposed between the power generation cell 12 and the first dummy cell 18 or between the power generation cell 12 and the third dummy cell 24. The membrane electrode assembly 80 in the first end power generation unit 16 and the second end power generation unit 22 for performing power generation at both ends of the stack body 14 in the stacking direction can be cooled under the same conditions as the other membrane electrode assembly 80. As a result, the balance between heat production and cooling become uniform over the entire stack body 14. Therefore, it is possible to achieve further improvement of the power generation performance and the power generation stability.

However, the first end power generation unit 16 and the second end power generation unit 22 are not essential constituent elements. The fuel cell stack 10 may include only one of the first end power generation unit 16 and the second end power generation unit 22, or may include none of the first end power generation unit 16 and the second end

What is claimed is:

1. A fuel cell stack comprising:
a stack body comprising a plurality of power generation cells stacked together in a stacking direction, the power generation cells each including a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having a gas diffusion layer of electrically conductive porous body; and
a dummy cell provided at least at one end of the stack body in the stacking direction;
wherein the dummy cell includes a dummy assembly corresponding to the membrane electrode assembly, a dummy resin frame member provided around the dummy assembly, and dummy separators sandwiching the dummy assembly;
the dummy assembly is formed by stacking a first electrically conductive porous body, a second electrically conductive porous body, and a third electrically conductive porous body each having a difference surface size in a manner that the second electrically conductive porous body is stacked on the first electrically conductive porous body, and the third electrically conductive porous body is stacked on the second electrically conductive porous body; and
a first joint layer interposed between the first electrically conductive porous body and the second electrically conductive porous body to join the first electrically conductive porous body and the second electrically conductive porous body together and a second joint layer interposed between the second electrically conductive porous body and the third electrically conductive porous body to join the second electrically conductive porous body and the third electrically conductive porous body together, are provided, wherein the first joint layer and the second joint layer are arranged at different positions in the stacking direction.

2. The fuel cell stack according to claim 1, wherein the first joint layer is provided discontinuously on a marginal position of a first stack part where the first electrically conductive porous body and the second electrically conductive porous body are stacked together; and
the second joint layer is provided discontinuously on a marginal position of a second stack part where the second electrically conductive porous body and the third electrically conductive porous body are stacked together.

3. The fuel cell stack according to claim 2, wherein the first joint layer and the second joint layer are provided alternately in a peripheral direction of the first stack part and the second stack part.

4. The fuel cell stack according to claim 1, wherein each of the first electrically conductive porous body, the second electrically conductive porous body, and the third electrically conductive porous body has a rectangular surface, and the first joint layer and the second joint layer are provided on long sides, excluding short sides, of the rectangular surface.

5. The fuel cell stack according to claim 1, wherein the surface size of the second electrically conductive porous body is larger than the surface size of the first electrically conductive porous body;
the surface size of the third electrically conductive porous body is larger than the surface size of the second electrically conductive porous body;
the dummy resin frame member includes an outer marginal portion, a shelf protruding inward from an inner end of the outer marginal portion over an entire periphery through a first stepped surface, and a thin portion protruding inward from an inner end of the shelf over an entire periphery through a second stepped surface;
an outer marginal portion of the third electrically conductive porous body is overlapped with the shelf of the dummy resin frame member;
an outer marginal portion of the second electrically conductive porous body is positioned adjacent to the thin portion of the dummy resin frame member; and
an outer end surface of the first electrically conductive porous body faces an inner end surface of the dummy resin frame member.

6. The fuel cell stack according to claim 5, wherein a thickness of the second electrically conductive porous body is larger than a height of the second stepped surface.

7. The fuel cell stack according to claim 5, wherein space is formed between the thin portion of the dummy resin frame member and the third electrically conductive porous body.

8. The fuel cell stack according to claim 1, wherein the surface size of the second electrically conductive porous body is larger than the surface size of the first electrically conductive porous body;

the surface size of the third electrically conductive porous body is larger than the surface size of the second electrically conductive porous body; and the dummy resin frame member includes a first stepped surface facing an outer end surface of the third electrically conductive porous body at a distance La therebetween, a second stepped surface facing an outer end surface of the second electrically conductive porous body at a distance Lb therebetween, and an inner end surface facing an outer end surface of the first electrically conductive porous body at a distance Lc therebetween, and a relationship of La<Lc<Lb is satisfied.

9. The fuel cell stack according to claim 8, wherein the dummy resin frame member includes an outer marginal portion, a shelf protruding inward from an inner end of the outer marginal portion over an entire periphery through the first stepped surface, and a thin portion protruding inward from an inner end of the shelf over an entire periphery through the second stepped surface; and an outer exposed portion of the second electrically conductive porous body protruding outward from an outer end surface of the first electrically conductive porous body is configured to face the thin portion and contact a protruding end surface of a bank protruding from the thin portion toward the outer exposed portion of the second electrically conductive porous body.

10. The fuel cell stack according to claim 9, wherein an outer exposed portion of the third electrically conductive porous body extending outward beyond an outer end surface of the second electrically conductive porous body and the shelf of the dummy resin frame member are joined together by an impregnation joint part where the outer exposed portion of the third electrically conductive porous body is impregnated with adhesive resin.

11. The fuel cell stack according to claim 10 wherein the resin impregnation joint part is provided discontinuously in the outer exposed portion of the third electrically conductive porous body in a peripheral direction.

12. The fuel cell stack according to claim 8, wherein the first electrically conductive porous body, the second electrically conductive porous body, and the third electrically conductive porous body have a same thickness.

13. The fuel cell stack according to claim 1, wherein an electrically conductive porous body as one of the first electrically conductive porous body, the second electrically conductive porous body, and the third electrically conductive porous body, and the dummy resin frame member are joined together by providing an impregnation joint part where the electrically porous body is impregnated with adhesive resin, discontinuously in a peripheral direction of an outer periphery of the electrically conductive porous body; and the impregnation joint part includes a corner joint part provided at a corner of the electrically conductive porous body, and an adjacent joint part provided on a long side of the electrically conductive porous body at a position adjacent to the corner joint part.

14. The fuel cell stack according to claim 13, wherein the impregnation joint part further includes a long side joint part positioned so as to divide the long side of the electrically conductive porous body between the corner joint parts into a plurality of long side segments, and a short side joint part positioned so as to divide the short side of the electrically conductive porous body between the corner joint parts into a plurality of short side segments; and a length of each of the long side segments is larger than a length of each of the short segments.

15. The fuel cell stack according to claim 14, wherein the long side segments have a same length;

the short side segments have a same length; and a relationship of Ld<Lf<Le is satisfied where Ld is an interval between the corner joint part and the adjacent joint part adjacent to the corner joint part, Le is a length of the long side segment, and Lf is a length of the short side segment.

16. The fuel cell stack according to claim 13, wherein the adhesive resin is part of the molten dummy resin frame member.

17. The fuel cell stack according to claim 16, wherein the part of the dummy resin frame member is a resin projection provided so as to protrude in a thickness direction of the dummy resin frame member.

18. The fuel cell stack according to claim 13, wherein the surface size of the second electrically conductive porous body is larger than the surface size of the first electrically conductive porous body;

the surface size of the third electrically conductive porous body is larger than the surface size of the second electrically conductive porous body;

the dummy resin frame member includes an outer marginal portion, a shelf protruding inward from an inner end of the outer marginal portion through a first stepped surface over an entire periphery, and a thin portion protruding inward from an inner end of the shelf through a second stepped surface over an entire periphery;

an outer marginal portion of the third electrically conductive porous body is overlapped with the shelf of the dummy resin frame member;

an outer marginal portion of the second electrically conductive porous body is positioned adjacent to the thin portion of the dummy resin frame member;

an outer end surface of the first electrically conductive porous body faces an inner end surface of the dummy resin frame member; and the shelf of the dummy resin frame member and an outer marginal portion of the third electrically conductive porous body are joined together by the impregnation joint part.

19. A method of producing a dummy cell provided at least at one end of a stack body of a fuel cell stack in a stacking direction, the fuel cell stack comprising:

the stack body comprising a plurality of power generation cells stacked together in the stacking direction, the power generation cells each including a membrane electrode assembly, a resin frame member provided around the membrane electrode assembly, and separators sandwiching the membrane electrode assembly, the membrane electrode assembly including an electrolyte membrane and electrodes provided on both sides of the electrolyte membrane, the electrodes each having a gas diffusion layer of electrically conductive porous body, the method comprising:

a first stacking step of stacking a first electrically conductive porous body, a second electrically conductive porous body, and a third electrically conductive porous body each having a difference surface size, in a stacking direction in a manner that a first adhesive layer is interposed between the first electrically conductive porous body and the second electrically conductive porous body and a second adhesive layer is interposed between the second electrically conductive porous body and the third electrically conductive porous body;

a hardening step of hardening the first adhesive layer and the second adhesive layer to form a first joint layer for joining the first electrically conductive porous body and the second electrically conductive porous body and form a second joint layer for joining the second electrically conductive porous body and the third electrically conductive porous body, and thereby obtaining a dummy assembly corresponding to the membrane electrode assembly;

a resin frame joining step of providing a dummy resin frame member on the dummy assembly and around the dummy assembly to thereby obtain a resin frame equipped dummy assembly; and a second stacking step of sandwiching the resin frame equipped dummy assembly between dummy separators to thereby obtain the dummy cell, wherein the first adhesive layer and the second adhesive layer are provided at different positions in the stacking direction in the first stacking step, to thereby form the first joint layer and the second joint layer at different positions in the stacking direction in the hardening step.

20. The method of producing the dummy cell according to claim 19, wherein after the first electrically conductive porous body, the second electrically conductive porous body, and the third electrically conductive porous body are stacked together in the first stacking step, in a state where surface pressure equal to surface pressure applied during power generation of the fuel cell stack is applied to the first electrically conductive porous body, the second electrically conductive porous body, and the third electrically conductive porous body, the first adhesive layer and the second adhesive layer are hardened in the hardening step.

21. The method of producing the dummy cell according to claim 19, wherein, in the first stacking step, the first adhesive layer is provided discontinuously in a marginal portion of a first stack part where the first electrically conductive porous body and the second electrically conductive porous body are stacked together, and the second adhesive layer is provided discontinuously in a marginal portion of a second stack part where the second electrically conductive porous body and the third electrically conductive porous body are stacked together.

22. The method of producing the dummy cell according to claim 21, wherein, in the first stacking step, the first adhesive layer and the second adhesive layer are provided alternately in a peripheral direction of the first stack part and the second stack part.

23. The method of producing the dummy cell according to claim 19, wherein in the first stacking step, the first adhesive layer and the second adhesive layer are provided on long sides, excluding short sides, of the first electrically conductive porous body, the second electrically conductive porous body, and the third electrically conductive porous body each having a rectangular surface.

24. The method of producing the dummy cell according to claim 19, wherein, in the resin frame joining step, in a state where the dummy resin frame member is provided around the dummy assembly, an outer marginal portion of an electrically conductive porous body as at least one of the first electrically conductive porous body, the second electrically conductive porous body, and the third electrically conductive porous body is impregnated with adhesive resin discontinuously in a peripheral direction of the outer marginal portion to form an impregnation joint part, to thereby join the dummy assembly and the dummy resin frame member together.

25. The method of producing the dummy cell according to claim 24, wherein, in the resin frame joining step, as the impregnation joint part, a corner joint part is formed at a corner of the electrically conductive porous body, and an adjacent joint part is formed at a position adjacent to the corner joint part on a long side of the electrically conductive porous body.

26. The method of producing the dummy cell according to claim 25, wherein, in the resin frame joining step, as the impregnation joint part, a long side joint part is provided to divide the long side of the electrically conductive porous body between the corner joint parts into a plurality of long side segments, and a short side joint part is provided to divide the short side of the electrically conductive porous body between the corner joint parts into a plurality of short side segments, in a manner that each of the long side segments is longer than each of the short side segments.

27. The method of producing the dummy cell according to claim 26, wherein, in the resin frame joining step, the impregnation joint part is provided on the electrically conductive porous body so that:

the long side segments have a same length, the short side segments have a same length, and a relationship of Ld<Lf<Le is satisfied where Ld is an interval between the corner joint part and the adjacent joint part adjacent to the corner joint part, Le is a length of the long side segment, and Lf is a length of the short side segment.

28. The method of producing the dummy cell according to claim 24, wherein, in the resin frame joining step, as the adhesive resin, the electrically conductive porous body is impregnated with part of the dummy resin frame member which has been molten, to thereby form the impregnation joint part.

29. The method of producing the dummy cell according to claim 28, wherein, in the resin frame joining step, a resin projection provided to protrude in a thickness direction of the dummy resin frame member is used as the part of the dummy resin frame member.

* * * * *

UNITED STATES PATENT AND TRADEMARK OFFICE
CERTIFICATE OF CORRECTION

PATENT NO. : 10,964,968 B2
APPLICATION NO. : 16/354345
DATED : March 30, 2021
INVENTOR(S) : Inoue et al.

Page 1 of 1

It is certified that error appears in the above-identified patent and that said Letters Patent is hereby corrected as shown below:

In Column 33, Line 36, at the end of the description:
It should read:
". . . power generation unit 22."

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*